United States Patent [19]

Woo et al.

[11] Patent Number: 5,519,780
[45] Date of Patent: May 21, 1996

[54] SYSTEM AND METHOD FOR PROVIDING COMPRESSED DIGITAL TELETEXT SERVICES AND TELETEXT SUPPORT SERVICES

[75] Inventors: Arthur S. Woo; Wayne S. Sheldrick, both of Scarborough; Keith B. Gammie, Markham; Hrad Hekimian, Scarborough, all of Canada

[73] Assignee: Scientific-Atlanta, Inc., Norcross, Ga.

[21] Appl. No.: 160,827

[22] Filed: Dec. 3, 1993

[51] Int. Cl.⁶ .................. H04L 9/00; H04N 7/025; H04N 7/167
[52] U.S. Cl. .................. 380/49; 380/10; 348/467; 348/468
[58] Field of Search .................. 348/465, 467, 348/468; 380/48, 49, 10

[56] References Cited

U.S. PATENT DOCUMENTS

| | | | |
|---|---|---|---|
| 4,115,662 | 9/1978 | Guinet et al. | 380/16 |
| 4,393,404 | 7/1983 | Cox et al. | 348/467 |
| 4,587,514 | 5/1986 | Schas et al. | 340/347 |
| 4,652,903 | 3/1987 | Lucas | 358/11 |
| 4,697,277 | 9/1987 | van Rassal | 375/116 |
| 4,723,283 | 2/1988 | Nagasawa et al. | 380/20 |
| 4,763,357 | 8/1988 | Barr | 380/48 |
| 4,787,085 | 11/1988 | Suto et al. | 370/110.1 |
| 4,817,142 | 3/1989 | van Rassal | 380/15 |
| 4,829,569 | 5/1989 | Seth-Smith et al. | 380/10 |
| 4,862,268 | 8/1989 | Campbell et al. | 348/467 X |
| 4,866,770 | 9/1989 | Seth-Smith et al. | 380/20 |
| 4,885,775 | 12/1989 | Lucas | 380/10 |
| 4,890,321 | 12/1989 | Seth-Smith et al. | 380/20 |
| 4,916,539 | 4/1990 | Galumbeck | 348/467 |
| 4,994,909 | 2/1991 | Graves et al. | 358/86 |
| 5,062,105 | 10/1991 | McKnight et al. | 370/84 |
| 5,200,823 | 4/1993 | Yoneda et al. | 358/146 |

OTHER PUBLICATIONS

Wasilewski, Anthony J., "Requirements and Method for High-Level Multiplexing of MPEG and Other Digital Service Bitstreams with Universal Transport Layer", International Organization for Standardization, ISO/IEC/JTC1/SC2/WG11 MPEG 92/ (Nov. 2, 1992).

Wasilewski, Anthony J., "Syntax Proposal for MPEG-2 Transport Stream Program Specific Information", International Organization for Standardization, ISO/IEC/JTC1/SC29/WG11 MPEG 93/ (Jul. 1993).

Primary Examiner—Gilberto Barrón, Jr.
Attorney, Agent, or Firm—Banner & Allegretti, Ltd.

[57] ABSTRACT

A teletext system provides teletext services and teletext support services in a multiservice communication system. Multiplexed data streams for a plurality of services, including teletext data, are transmitted in a sequence of frames between a transmitter location and a receiver location. Teletext information is transmitted in the format of a header packet and a data packet. The header packet contains information identifying the teletext information according to page number as well as other filter fields, such as language, time zone, etc. By appropriate selection of the values of the filter fields, the operator is afforded greater flexibility in providing a variety of classes of service and service support to subscribers. In addition, the system may be easily be reconfigured to support the addition of services or the cancellation of services.

15 Claims, 33 Drawing Sheets

| FIELD DESCRIPTION | SIZE (BITS) |
|---|---|
| PACKET TYPE | 4 |
| DECODER TYPE | 4 |
| ENCRYPT FLAG | 1 |
| FORWARD LINK FLAG | 1 |
| BACKWARD LINK FLAG | 1 |
| START ROW | 5 |
| START FLAG | 1 |
| BOX MODE | 2 |
| CHARACTER SET | 5 |
| PAGE NUMBER | 16 |
| FILTER ENABLE | 8 |
| FILTER 1 (SERVICE NUMBER) | 8 |
| FILTER 2 (TIME ZONE) | 3 |
| FILTER 3 (SERVICE CATEGORY) | 5 |
| FILTER 4 (LANGUAGE) | 4 |
| FILTER 5 (SECURITY ELEMENT) | 1 |
| FILTER 6 | 1 |
| FILTER 7 | 1 |
| FILTER 8 | 1 |
| TEXT ELEMENTAL STREAM NUMBER | 8 |
| SPARE = 0 | 256 |
| TOTAL | 336 |

FIG.5

| FIELD DESCRIPTION | SIZE (BITS) |
|---|---|
| PACKET TYPE | 4 |
| DECODER TYPE | 4 |
| TELETEXT DATA | 320 |
| SPARE = 0 | 8 |
| TOTAL | 336 |

FIG.6

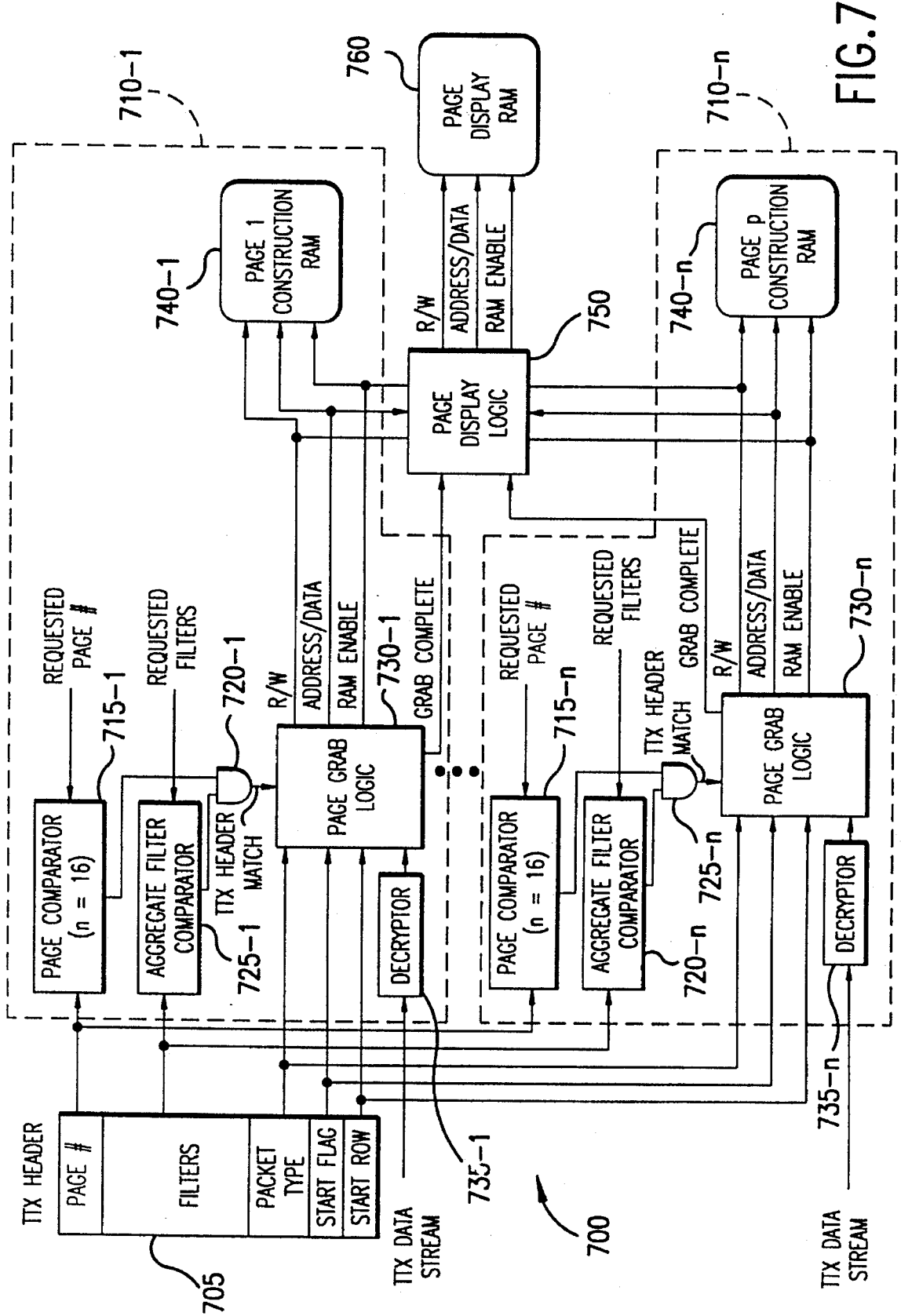

| PROT | ROW | RADIO SPECIFIC "SERVICE NOT AUTHORIZED" PAGE |
|---|---|---|
| | 1 | |
| | 2 | |
| | 3 | |
| | 4 | |
| | 5 | |
| | 6 | |
| GBL | 7 | |
| | 8 | |
| CAT | 9 | YOU ARE NOT AUTHORIZED FOR |
| | | EASY-LISTENING RADIO |
| | 10 | |
| | 11 | |
| | 12 | |
| | 13 | |
| | 14 | |
| | 15 | |
| | 16 | |
| | 17 | |
| | 18 | |

FIG.13A

| PROT | ROW | TV SPECIFIC "SERVICE NOT AUTHORIZED" PAGE |
|---|---|---|
| | 1 | |
| | 2 | |
| | 3 | |
| | 4 | |
| | 5 | |
| | 6 | |
| GBL | 7 | |
| | 8 | |
| CAT | 9 | YOU ARE NOT AUTHORIZED FOR |
| | | THE PRIME-TIME MOVIE CHANNEL |
| | 10 | |
| | 11 | |
| | 12 | |
| | 13 | |
| | 14 | |
| | 15 | |
| | 16 | |
| | 17 | |
| | 18 | |

FIG.13B

|  | HEADER ROW | | | DATA ROW |
|---|---|---|---|---|
| PAGE TYPE | START ROW | START FLAG | SrvCat FILTER | TEXT |
| GLOBAL<br>TV<br>RADIO | 7<br>9<br>9 | 1<br>0<br>0 | ---<br>TV<br>RADIO | "YOU ARE NOT AUTHORIZED FOR"<br>"THE PRIME_TIME MOVIE CHANNEL"<br>"EASY-LISTENING RADIO" |

FIG.14

| PROT | ROW | RADIO 2 "SERVICE NOT AUTHORIZED" PAGE |
|---|---|---|
| | 1 | |
| | 2 | |
| | 3 | |
| | 4 | |
| | 5 | |
| | 6 | |
| GBL | 7 | |
| | 8 | |
| SVR# | 9 | YOU ARE NOT AUTHORIZED FOR |
| | 10 | HARD-ROCK |
| CAT | 11 | RADIO SERVICE |
| | 12 | |
| | 13 | |
| | 14 | |
| | 15 | |
| | 16 | |
| | 17 | |
| | 18 | |

FIG. 16B

| PROT | ROW | RADIO 3 "SERVICE NOT AUTHORIZED" PAGE |
|---|---|---|
| | 1 | |
| | 2 | |
| | 3 | |
| | 4 | |
| | 5 | |
| | 6 | |
| GBL | 7 | |
| | 8 | |
| SVR# | 9 | YOU ARE NOT AUTHORIZED FOR |
| | 10 | CLASSICAL |
| CAT | 11 | RADIO SERVICE |
| | 12 | |
| | 13 | |
| | 14 | |
| | 15 | |
| | 16 | |
| | 17 | |
| | 18 | |

FIG. 16C

| PAGE TYPE | HEADER ROW | | | | DATA ROW |
|---|---|---|---|---|---|
| | START ROW | START FLAG | SrvCat FILTER | Srv # FILT | TEXT |
| GLOBAL | 7 | 1 | --- | -- | "YOU ARE NOT AUTHORIZED FOR" |
| TV | 9 | 0 | TV | -- | "THE PRIME_TIME MOVIE CHANNEL" |
| RADIO | 11 | 0 | RADIO | -- | "RADIO SERVICE" |
| RADIO 1 | 9 | 0 | RADIO | 1 | "EASY-LISTENING" |
| RADIO 2 | 9 | 0 | RADIO | 2 | "HARD ROCK" |
| RADIO 3 | 9 | 0 | RADIO | 3 | "CLASSICAL" |

FIG. 17

| PROT | ROW | TV TIME ZONE 1 "SERVICE NOT AUTHORIZED" PAGE |
|---|---|---|
| | 1 | |
| | 2 | |
| | 3 | |
| | 4 | |
| | 5 | |
| | 6 | |
| GBL | 7 | |
| | 8 | |
| CAT | 9 | YOU ARE NOT AUTHORIZED FOR |
| | | THE PRIME-TIME MOVIE CHANNEL |
| | 10 | |
| CAT | 11 | THE NEXT SHOW STARTS: |
| T2 | 12 | 1:00 PM |
| | 13 | |
| | 14 | |
| | 15 | |
| | 16 | |
| | 17 | |
| | 18 | |

FIG.19A

| PROT | ROW | TV TIME ZONE 2 "SERVICE NOT AUTHORIZED" PAGE |
|---|---|---|
| | 1 | |
| | 2 | |
| | 3 | |
| | 4 | |
| | 5 | |
| | 6 | |
| GBL | 7 | |
| | 8 | |
| CAT | 9 | YOU ARE NOT AUTHORIZED FOR |
| | | THE PRIME-TIME MOVIE CHANNEL |
| | 10 | |
| CAT | 11 | THE NEXT SHOW STARTS: |
| T2 | 12 | 2:00 PM |
| | 13 | |
| | 14 | |
| | 15 | |
| | 16 | |
| | 17 | |
| | 18 | |

FIG.19B

| PROT | ROW | TV TIME ZONE 3 "SERVICE NOT AUTHORIZED" PAGE |
|---|---|---|
| | 1 | |
| | 2 | |
| | 3 | |
| | 4 | |
| | 5 | |
| | 6 | |
| GBL | 7 | |
| | 8 | |
| CAT | 9 | YOU ARE NOT AUTHORIZED FOR |
| | | THE PRIME-TIME MOVIE CHANNEL |
| | 10 | |
| CAT | 11 | THE NEXT SHOW STARTS: |
| T2 | 12 | 3:00 PM |
| | 13 | |
| | 14 | |
| | 15 | |
| | 16 | |
| | 17 | |
| | 18 | |

FIG.19C

| PROT | ROW | TV TIME ZONE 4 "SERVICE NOT AUTHORIZED" PAGE |
|---|---|---|
| | 1 | |
| | 2 | |
| | 3 | |
| | 4 | |
| | 5 | |
| | 6 | |
| GBL | 7 | |
| | 8 | |
| CAT | 9 | YOU ARE NOT AUTHORIZED FOR |
| | | THE PRIME-TIME MOVIE CHANNEL |
| | 10 | |
| CAT | 11 | THE NEXT SHOW STARTS: |
| T2 | 12 | 4:00 PM |
| | 13 | |
| | 14 | |
| | 15 | |
| | 16 | |
| | 17 | |
| | 18 | |

| PAGE TYPE | HEADER ROW | | | | | DATA ROW |
|---|---|---|---|---|---|---|
| | START | | FILTERS | | | |
| | ROW | FLAG | CAT | Srv # | TZ | TEXT |
| GLOBAL | 7 | 1 | — | — | — | "YOU ARE NOT AUTHORIZED FOR" |
| TV | 9 | 0 | TV | — | — | "THE PRIME_TIME MOVIE CHANNEL" ":" "THE NEXT SHOW STARTS:" |
| TV TZ1 | 12 | 0 | TV | — | 1 | "1:00 PM" |
| TV TZ2 | 12 | 0 | TV | — | 2 | "2:00 PM" |
| TV TZ3 | 12 | 0 | TV | — | 3 | "3:00 PM" |
| TV TZ4 | 12 | 0 | TV | — | 4 | "4:00 PM" |
| RADIO | 11 | 0 | RADIO | — | — | "RADIO SERVICE" |
| RAD 1 | 9 | 0 | RADIO | 1 | — | "EASY-LISTENING" |
| RAD 2 | 9 | 0 | RADIO | 2 | — | "HARD ROCK" |
| RAD 3 | 9 | 0 | RADIO | 3 | — | "CLASSICAL" |

| LANGUAGE | SERVICE CATEGORY | SERVICE NUMBER | TIME ZONE |
|---|---|---|---|
| NO AUTH KEY | TV NOT AUTH | | TV NA TZ=0 |
| MAIN MENU | CAPTIONS | | TV NA TZ=1 |
| | RADIO UNAUTH | R1 UNAUTH | TV NA TZ=2 |
| | RADIO AUTH | R2 UNAUTH | TV NA TZ=3 |
| | CAPTIONS | R3 UNAUTH | |

FIG.21

| USER | FILTER | SCOPE | RIGHTS |
|---|---|---|---|
| TTX ADMIN | LANGUAGE | ALL | CREATE |
| | CATEGORY | ALL | CREATE |
| | SERVICE # | ALL | CREATE |
| | TIME ZONE | ALL | CREATE |

FIG.22

| USER | FILTER | SCOPE | RIGHTS |
|---|---|---|---|
| TTX ADMIN | LANGUAGE<br>CATEGORY<br>SERVICE #<br>TIME ZONE | ALL<br>ALL<br>ALL<br>ALL | CREATE<br>CREATE<br>CREATE<br>CREATE |
| TV MGR | LANGUAGE<br>CATEGORY<br>SERVICE #<br>TIME ZONE | GLOBAL<br>TV<br>ALL<br>ALL | VIEW<br>CREATE<br>CREATE<br>CREATE |
| RADIO MGR | LANGUAGE<br>CATEGORY<br>SERVICE #<br>TIME ZONE | GLOBAL<br>RADIO<br>ALL<br>ALL | VIEW<br>CREATE<br>CREATE<br>CREATE |

FIG.23

| LNG | CAT | S# | TZ | ROW |
|---|---|---|---|---|
| G | G | G | G | 1 |
| G | G | G | G | 2 |
| G | G | G | G | 3 |
| G | G | G | G | 4 |
| G | G | G | G | 5 |
| G | G | G | G | 6 |
| G |   | G | G | 7 |
| G |   |   |   | 8 |
| G |   |   |   | 9 |
| G |   |   |   | 10 |
| G |   |   |   | 11 |
| G |   |   |   | 12 |
| G | G | G | G | 13 |
| G | G | G | G | 14 |
| G | G | G | G | 15 |
| G | G | G | G | 16 |
| G | G | G | G | 17 |
| G | G | G | G | 18 |
| G | G | G | G | 19 |

YOU ARE NOT AUTHORIZED FOR

| LNG | CAT | S# | TZ | ROW | |
|---|---|---|---|---|---|
| G | G | G | G | 1 | |
| G | G | G | G | 2 | |
| G | G | G | G | 3 | |
| G | G | G | G | 4 | |
| G | G | G | G | 5 | |
| G | G | G | G | 6 | |
| G | G | G | G | 7 | |
| G | TV | | | 8 | YOU ARE NOT AUTHORIZED FOR |
| G | TV | | | 9 | THE PRIME-TIME MOVIE CHANNEL |
| G | TV | | | 10 | |
| G | TV | | | 11 | |
| G | TV | | | 12 | |
| G | G | G | G | 13 | |
| G | G | G | G | 14 | |
| G | G | G | G | 15 | |
| G | G | G | G | 16 | |
| G | G | G | G | 17 | |
| G | G | G | G | 18 | |

FIG.24C

| LNG | CAT | S# | TZ | ROW | |
|---|---|---|---|---|---|
| G | G | G | G | 1 | |
| G | G | G | G | 2 | |
| G | G | G | G | 3 | |
| G | G | G | G | 4 | |
| G | G | G | G | 5 | |
| G | G | G | G | 6 | |
| G | G | G | G | 7 | |
| G | RAD | | | 8 | YOU ARE NOT AUTHORIZED FOR |
| G | RAD | | | 9 | EASY-LISTENING RADIO |
| G | RAD | | | 10 | |
| G | RAD | | | 11 | |
| G | RAD | | | 12 | |
| G | G | G | G | 13 | |
| G | G | G | G | 14 | |
| G | G | G | G | 15 | |
| G | G | G | G | 16 | |
| G | G | G | G | 17 | |
| G | G | G | G | 18 | |

| USER | FILTER | SCOPE | RIGHTS |
|---|---|---|---|
| TTX ADMIN | LANGUAGE<br>CATEGORY<br>SERVICE #<br>TIME ZONE | ALL<br>ALL<br>ALL<br>ALL | CREATE<br>CREATE<br>CREATE<br>CREATE |
| TV MGR | LANGUAGE<br>CATEGORY<br>SERVICE #<br>TIME ZONE | GLOBAL<br>TV<br>ALL<br>ALL | VIEW<br>CREATE<br>CREATE<br>CREATE |
| RADIO MGR | LANGUAGE<br>CATEGORY<br>SERVICE #<br>TIME ZONE | GLOBAL<br>RADIO<br>ALL<br>ALL | VIEW<br>CREATE<br>CREATE<br>CREATE |
| RADIO 1 | LANGUAGE<br>CATEGORY<br>SERVICE #<br>TIME ZONE | GLOBAL<br>RADIO<br>1<br>ALL | VIEW<br>VIEW<br>EDIT<br>CREATE |
| RADIO 2/3 | LANGUAGE<br>CATEGORY<br>SERVICE #<br>TIME ZONE | GLOBAL<br>RADIO<br>2,3<br>ALL | VIEW<br>VIEW<br>EDIT<br>CREATE |

| LNG | CAT | S# | TZ | ROW | |
|---|---|---|---|---|---|
| G | G | G | G | 1 | |
| G | G | G | G | 2 | |
| G | G | G | G | 3 | |
| G | G | G | G | 4 | |
| G | G | G | G | 5 | |
| G | G | G | G | 6 | |
| G | G | G | G | 7 | |
| G | RAD | G | | 8 | YOU ARE NOT AUTHORIZED FOR |
| G | RAD | 1 | | 9 | |
| G | RAD | G | | 10 | RADIO SERVICE |
| G | RAD | G | | 11 | |
| G | RAD | G | | 12 | |
| G | G | G | G | 13 | |
| G | G | G | G | 14 | |
| G | G | G | G | 15 | |
| G | G | G | G | 16 | |
| G | G | G | G | 17 | |
| G | G | G | G | 18 | |
| G | G | G | G | 19 | |

FIG.26B

| LNG | CAT | S# | TZ | ROW | |
|---|---|---|---|---|---|
| G | G | G | G | 1 | |
| G | G | G | G | 2 | |
| G | G | G | G | 3 | |
| G | G | G | G | 4 | |
| G | G | G | G | 5 | |
| G | G | G | G | 6 | |
| G | G | G | G | 7 | |
| G | RAD | G | | 8 | YOU ARE NOT AUTHORIZED FOR |
| G | RAD | 1 | | 9 | EASY-LISTENING |
| G | RAD | G | | 10 | RADIO SERVICE |
| G | RAD | G | | 11 | |
| G | RAD | G | | 12 | |
| G | G | G | G | 13 | |
| G | G | G | G | 14 | |
| G | G | G | G | 15 | |
| G | G | G | G | 16 | |
| G | G | G | G | 17 | |
| G | G | G | G | 18 | |

| USER | FILTER | SCOPE | RIGHTS |
|---|---|---|---|
| TTX ADMIN | LANGUAGE<br>CATEGORY<br>SERVICE #<br>TIME ZONE | ALL<br>ALL<br>ALL<br>ALL | CREATE<br>CREATE<br>CREATE<br>CREATE |
| TV MGR | LANGUAGE<br>CATEGORY<br>SERVICE #<br>TIME ZONE | GLOBAL<br>TV<br>ALL<br>ALL | VIEW<br>CREATE<br>CREATE<br>CREATE |
| TV TZ | LANGUAGE<br>CATEGORY<br>SERVICE #<br>TIME ZONE | GLOBAL<br>TV<br>ALL<br>ALL | VIEW<br>VIEW<br>VIEW<br>EDIT |
| RADIO MGR | LANGUAGE<br>CATEGORY<br>SERVICE #<br>TIME ZONE | GLOBAL<br>RADIO<br>ALL<br>ALL | VIEW<br>CREATE<br>CREATE<br>CREATE |
| RADIO 1 | LANGUAGE<br>CATEGORY<br>SERVICE #<br>TIME ZONE | GLOBAL<br>RADIO<br>1<br>ALL | VIEW<br>VIEW<br>EDIT<br>CREATE |
| RADIO 2/3 | LANGUAGE<br>CATEGORY<br>SERVICE #<br>TIME ZONE | GLOBAL<br>RADIO<br>2,3<br>ALL | VIEW<br>VIEW<br>EDIT<br>CREATE |

FIG. 27

| LNG | CAT | S# | TZ | ROW |
|-----|-----|----|----|-----|
| G | G | G | G | 1 |
| G | G | G | G | 2 |
| G | G | G | G | 3 |
| G | G | G | G | 4 |
| G | G | G | G | 5 |
| G | G | G | G | 6 |
| G | G | G | G | 7 |
| G | TV | | | 8 |
| G | TV | | | 9 |
| G | TV | | | 10 |
| G | TV | | | 11 |
| G | TV | | 1 | 12 |
| G | G | G | G | 13 |
| G | G | G | G | 14 |
| G | G | G | G | 15 |
| G | G | G | G | 16 |
| G | G | G | G | 17 |
| G | G | G | G | 18 |

YOU ARE NOT AUTHORIZED FOR

THE PRIME-TIME MOVIE CHANNEL

THE NEXT SHOW STARTS:
1:00 PM

FIG.28

| USER | FILTER | SCOPE | RIGHTS |
|---|---|---|---|
| TTX ADMIN | LANGUAGE<br>CATEGORY<br>SERVICE #<br>TIME ZONE | ALL<br>ALL<br>ALL<br>ALL | CREATE<br>CREATE<br>CREATE<br>CREATE |
| TV MGR | LANGUAGE<br>CATEGORY<br>SERVICE #<br>TIME ZONE | GBL, 1<br>TV<br>ALL<br>ALL | CREATE<br>CREATE<br>CREATE<br>CREATE |
| TV TZ | LANGUAGE<br>CATEGORY<br>SERVICE #<br>TIME ZONE | GLOBAL<br>TV<br>ALL<br>ALL | VIEW<br>VIEW<br>VIEW<br>EDIT |
| RADIO MGR | LANGUAGE<br>CATEGORY<br>SERVICE #<br>TIME ZONE | GLOBAL<br>RADIO<br>ALL<br>ALL | VIEW<br>CREATE<br>CREATE<br>CREATE |
| RADIO 1 | LANGUAGE<br>CATEGORY<br>SERVICE #<br>TIME ZONE | GLOBAL<br>RADIO<br>1<br>ALL | VIEW<br>VIEW<br>EDIT<br>CREATE |
| RADIO 2/3 | LANGUAGE<br>CATEGORY<br>SERVICE #<br>TIME ZONE | GLOBAL<br>RADIO<br>2,3<br>ALL | VIEW<br>VIEW<br>EDIT<br>CREATE |

FIG.29

| LNG | CAT | S# | TZ | ROW | |
|---|---|---|---|---|---|
| G | TV | | | 1 | |
| G | TV | | | 2 | |
| G | TV | | | 3 | |
| G | TV | | | 4 | |
| G | TV | | | 5 | |
| G | TV | | | 6 | |
| G | TV | | | 7 | |
| G | TV | | | 8 | |
| G | TV | | | 9 | |
| G | TV | | | 10 | |
| G | TV | | | 11 | |
| G | TV | | | 12 | |
| G | TV | | | 13 | |
| G | TV | | | 14 | |
| G | TV | | | 15 | |
| G | TV | | | 16 | |
| G | TV | | | 17 | |
| G | TV | | | 18 | |
| G | TV | | | 19 | |
| G | TV | | | 20 | |

FIG.30A

| LNG | CAT | S# | TZ | ROW | |
|---|---|---|---|---|---|
| 1 | TV | | | 1 | |
| 1 | TV | | | 2 | |
| 1 | TV | | | 3 | |
| 1 | TV | | | 4 | |
| 1 | TV | | | 5 | |
| 1 | TV | | | 6 | |
| 1 | TV | | | 7 | |
| 1 | TV | | | 8 | |
| 1 | TV | | | 9 | |
| 1 | TV | | | 10 | |
| 1 | TV | | | 11 | |
| 1 | TV | | | 12 | |
| 1 | TV | | | 13 | |
| 1 | TV | | | 14 | |
| 1 | TV | | | 15 | |
| 1 | TV | | | 16 | |
| 1 | TV | | | 17 | |
| 1 | TV | | | 18 | |
| 1 | TV | | | 19 | |
| 1 | TV | | | 20 | |

FIG.30B

S%; IPPV SKELETON PAGE

RATING: %PR%

NOW SHOWING:

TITLE

STARRING:

STARS

SPECIAL FAMILY VIEWING PRICE: $ %CS1%
TO PURCHASE THIS MOVIE PRESS: BUY

FIG.31A

IPPV SKELETON PAGE WITH TEMPLATES FILLED

RATING: G

NOW SHOWING:

It's A Wonderful Life

STARRING:

James Stewart

SPECIAL FAMILY VIEWING PRICE: $2.50
TO PURCHASE THIS MOVIE PRESS: BUY

FIG.31B

| PAGE | DESCRIPTION | CATEGORY | SERVICE | CONTROL |
|---|---|---|---|---|
| 0000–EFFF | STANDARD EPG | DISABLED | DISABLED | 1 |
| F000–FFFF | DECODER MENU/CONTROL | DISABLED | DISABLED | 1 |
| 0000–FFFF | TELETEXT SERVICE n | TTXi | n | 0 |
| 0000–FFFF | NON-TTX SERVICE n | NOT TTX | n | 0 |
| 0000–FFFF | PERSONAL MESSAGE SERVICE n | TTX | n | 0 |

FIG.32A

| PAGE | DESCRIPTION | CATEGORY | SERVICE | CONTROL |
|---|---|---|---|---|
| 0000–FFFF | DECODER MENU/CONTROL | DISABLED | DISABLED | 1 |
| 0000–FFFF | TELETEXT SERVICE n | TTXi | n | 0 |
| 0000–FFFF | NON-TTX SERVICE n | NOT TTX | n | 0 |
| 0000–FFFF | PERSONAL MESSAGE SERVICE n | TTX | n | 0 |
| 0000–FFFF | TTX SERVICE EPG | TTX | n | 0 |

FIG.32B

| TES # | USAGE | TES # DELIVERY |
|---|---|---|
| 0 . . . 14 | TTX SERVICE 0 . . . TTX SERVICE 14 | VIRTUAL CHANNEL'S PHYSICAL TEXT SERVICES # FIELD FILLED WITH THE SERVICE #. TTX SERVICE EPG OCCUPY THIS RANGE. |
| 15 . . . 29 | NON-TTX SERVICE . . . NON-TTX SERVICE | VIRTUAL CHANNEL'S PHYSICAL TEXT SERVICE # FILLED WITH TES # |
| 30 | PERSONAL MESSAGE | ADP |
| 31 | NETWORK CONTROL, BROADCAST, STANDARD EPG | IMPLIED BY MSK. |

FIG.33

| FEATURE | PAGE RANGE | CATEGORY / SERVICE # | TES # |
|---|---|---|---|
| SERVICE RELATED | 0000 - CFFF | NETWORK CONFIGURED | FILTER MAPPED |
| PERSONAL MESSAGE | D000 - DFFF | DISABLED | 30 |
| STANDARD EPG | E000 - EFFF | DISABLED | 31 |
| NETWORK CONTROL | F000 - FFFF | NETWORK CONFIGURED | 31 |

FIG.34

SYSTEM AND METHOD FOR PROVIDING COMPRESSED DIGITAL TELETEXT SERVICES AND TELETEXT SUPPORT SERVICES

This application is related by subject matter to U.S. application Ser. No. 08/161,160, entitled "System and Method for Transmitting a Plurality of Digital Services Including Imaging Services" Ser. No. 08/160,828, entitled "System and Method for Transmitting a Plurality of Digital Services Including Compressed Imaging Services and Associated Ancillary Data Services" Ser. No. 08/160,841, entitled "Memory Efficient Method and Apparatus for Synch Detection" now U.S. Pat. No. 5,420,640, Ser. No. 08/161,159, entitled "A Multi-Service Data Receiver Architecture" Ser. No. 08/160,848, entitled "System and Method for Simultaneously Authorizing Multiple Virtual Channels" now U.S. Pat. No. 5,425,101, and Ser. No. 08/160,835, entitled "System and Method for Transmitting and Receiving Variable Length Authorization Control for Digital Services" now U.S. Pat. No. 5,506,904 filed concurrently herewith, and is a continuation-in-part of Ser. No. 08/101,974, entitled "Method and Apparatus for Uniquely Encrypting a Plurality of Services at a Transmission Site" filed Aug. 4, 1993 now U.S. Pat. No. 5,381,481.

BACKGROUND OF THE INVENTION

1. Field of the Invention

The present invention relates generally to digital signal transmission, and more particularly, to a system and method for providing digital services, including compressed teletext services and teletext support services, for selective display at a plurality of remote locations.

2. Description of the Relevant Art

With the growing trend toward a merger of the previously separate technologies of telecommunications including voice and data telecommunications and television including satellite, broadcast and cable television, there has emerged an increased interest in developing adaptable transmission systems capable of handling any one or more of a collection or plurality of such services. The primary media investigated for providing such services to date comprise, for example, coaxial cable, land-based microwave, so-called cellular radio, broadcast FM, broadcast satellite and optical fiber, to name a few.

Each media has its own characteristics. For example, comparing cable and satellite for digital data transmission, cable tends to have a medium error rate, but, when errors appear, the errors come in long bursts. Satellite as a media has a pretty poor error rate, primarily due to the requisite weak signal power, and hence, low signal to noise ratio. In satellite, then, the poor error rate is specially corrected utilizing such techniques as convolutional error correctors, not required in a cable environment.

In copending U.S. application Ser. No. 07/968,846 filed Oct. 30, 1992 and entitled "System and Method for Transmitting a Plurality of Digital Services," there is described an encoder for generating a multiplexed data stream carrying services to remote locations via, for example, a satellite or a cable distribution network. The generated data stream comprises a continuous sequence of frames, each frame comprising two fields, and each field comprising a plurality of lines. A first group of lines of a field defines a transport layer and a second group of lines defines a service data region. A feature of the disclosed scheme is the ability to dynamically vary the multiplexed data stream from field to field. A further feature of the disclosed scheme is that the data transmission rate of the multiplexed data stream is related to the frequency of known analog video formats, i.e. frame, field and horizontal line rates.

In copending U.S. application Ser. No. 07/970,918 filed Nov. 2, 1992, entitled "System and Method for Multiplexing a Plurality of Digital Program Services for Transmission to Remote Locations," there is described another system, this for multiplexing a plurality of digital program services comprising a collection of, for example, video, audio, teletext, closed-captioning and "other data" services. According to the disclosed scheme, a plurality of subframe data streams are generated, each having a transport layer region and a program data region. These subframe data streams are then multiplexed together into superframes having a transport layer region and a subframe data region.

While these disclosed transmission systems permit a variety of services to be transmitted over various media to remote locations, there remains a need to provide yet other alternative arrangements more particularly adapted to the wide variety of services that may be offered over various media and permit the end user at the remote location greater flexibility over the data content the user is ultimately enabled to receive. Moreover, such a system should be able to be easily adapted to transmit an increasing number of different services in an increasingly efficient manner, for example, utilizing the same or less bandwidth.

In such multiservice communication systems, it is desirable to provide a teletext (sometimes referred to herein as "TTX") system. TTX systems included in the broader communication system may accomplish several functions. The TTX system may provide support to facilitate operation of the decoder by the subscriber. Such support may take the form of menu pages, help pages, and/or program guides. In addition, the TTX system should supply TTX services per se, such as stock reports, weather reports, and news. Furthermore, the TTX system should provide support for individual services included in the multiplexed signal. For example, TTX support can facilitate impulse pay-per-view (IPPV) purchases of television services or provide the current program name for television or radio services.

U.S. Pat. No. 4,866,770 provides an example of a teletext system incorporated into a multiservice system. Teletext information is transmitted in a B-type multiplexed analog components (B-MAC) signal using two types of data formats: a teletext header and a text line. The teletext header contains control information and the page number of the subsequent text page. The text line contains a line of ASCII characters. The display of TTX information may be initiated by either the subscriber or by the system operator. In response, the decoder grabs the appropriate TTX page from the received signal and generates a text message therefrom. The text message is then displayed. Accordingly, the only way to distinguish between TTX pages is according to page number.

In an analog environment (e.g., B-MAC), the number of services (e.g., radio, television, TTX or data) is limited typically to less than 10 services per multiplexed signal. The TTX system is implemented by allocating a page range from a maximum, e.g. of 0-65535 (or 0000-FFFF in hexadecimal), for each specific TTX use. In one such allocation, the page range 0-1000 may be restricted to TTX support of television services. Once the definition of page ranges are allocated, they are fixed for the life of the system. Thereafter, the configured system must support all possible services at all future times. Furthermore, there is no other way to distinguish between teletext pages except according to page number. As a consequence, every different teletext page must have a different page number, and the maximum page range serves as an absolute limit on the number of pages that may be transmitted in the system. Thus, current teletext systems are inflexible.

SUMMARY OF THE INVENTION

It is an object of the present invention to provide a teletext system in a multi-service communication system having a high degree of flexibility of implementation.

It is a further object of the present invention to provide a teletext system in a multi-service communication system having a plurality of filters so that teletext pages may be may distinguished between on the basis of several criteria.

It is a further object of the present invention to provide a teletext system in a multi-service communication system that permits each service to have the maximum page range.

It is a further object of the invention to provide a teletext system in a multiservice communication system that may be dynamically configured by a system operator.

The above objects of the present invention and others are achieved by a teletext system in a multiservice communication system in which teletext service and service support are implemented through a plurality of filter fields, including a page number field, in teletext header packets. By controlling the filter values of the filter fields, the operator may selectively provide particular teletext services and/or service support to a particular class of subscribers without being limited by page number. The present invention is highly flexible because the operator can configure the system in any way utilizing the filter fields when services are added or dropped. Furthermore, the operator may define additional filter fields or redefine existing fields as the need arises. The provision of filters expands the range of choices that the operator may make available to the subscriber.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIG. 5 depicts one preferred embodiment of a teletext header row packet.

FIG. 6 depicts one preferred embodiment of a teletext data row packet.

FIG. 7 illustrates a first embodiment of multiple page grab logic in the teletext system.

FIGS. 13A and 13B illustrate examples of text pages associated with the television and radio service configuration of FIG. 12.

FIG. 14 illustrates the teletext header row and text row packets used in implementing the text pages of FIGS. 13A and 13B.

FIG. 15 depicts an example of a television and multiple radio service configuration according to the present invention.

FIGS. 16A, 16B, and 16C illustrate examples of text pages associated with the television and multiple radio service configuration of FIG. 15.

FIG. 17 illustrates the teletext header row and text row packets used in implementing the text pages of FIGS. 16A, 16B, and 16C.

FIGS. 19A–19D illustrate examples of text pages associated with the television with time zone and multiple radio service configuration of FIG. 18.

FIG. 20 illustrates the teletext header row and text row packets used in implementing the text pages of FIGS. 19A–19D.

FIG. 21 depicts an example of a television with time zone and captions and multiple radio service configuration according to the present invention.

FIG. 22 depicts an example of the scope and rights of a teletext administrator.

FIG. 23 depicts an example of the scope and rights of a teletext administrator, a television manager, and a radio manager.

FIGS. 24A–24C illustrate text pages that may be created according to the example of FIG. 23.

FIG. 25 depicts an example of the scope and rights of a teletext administrator, a television manager, a radio manager, and two radio service users.

FIGS. 26A–26B illustrate text pages that may be created according to the example of FIG. 25.

FIG. 27 depicts a first example of the scope and rights of a teletext administrator, a television manager, a radio manager, two radio service users, and a television time zone user.

FIG. 28 illustrates a text page that may be created according to the example of FIG. 27.

FIG. 29 depicts a first example of the scope and rights of a teletext administrator, a television manager, a radio manager, two radio service users, and a television time zone user.

FIGS. 30A–30B illustrate text pages that may be created according to the example of FIG. 29.

FIG. 31A illustrates an example of a template page.

FIG. 31B illustrates a completed page based on the template page of FIG. 31A.

FIGS. 32A–32B illustrate a possible page allocation for the decoder embodiment of FIG. 8.

FIG. 33 illustrates a possible correlation between TES # and service.

FIG. 34 illustrates a possible page allocation for the decoder embodiment of FIG. 9.

DETAILED DESCRIPTION OF THE DRAWINGS

Figure 1:
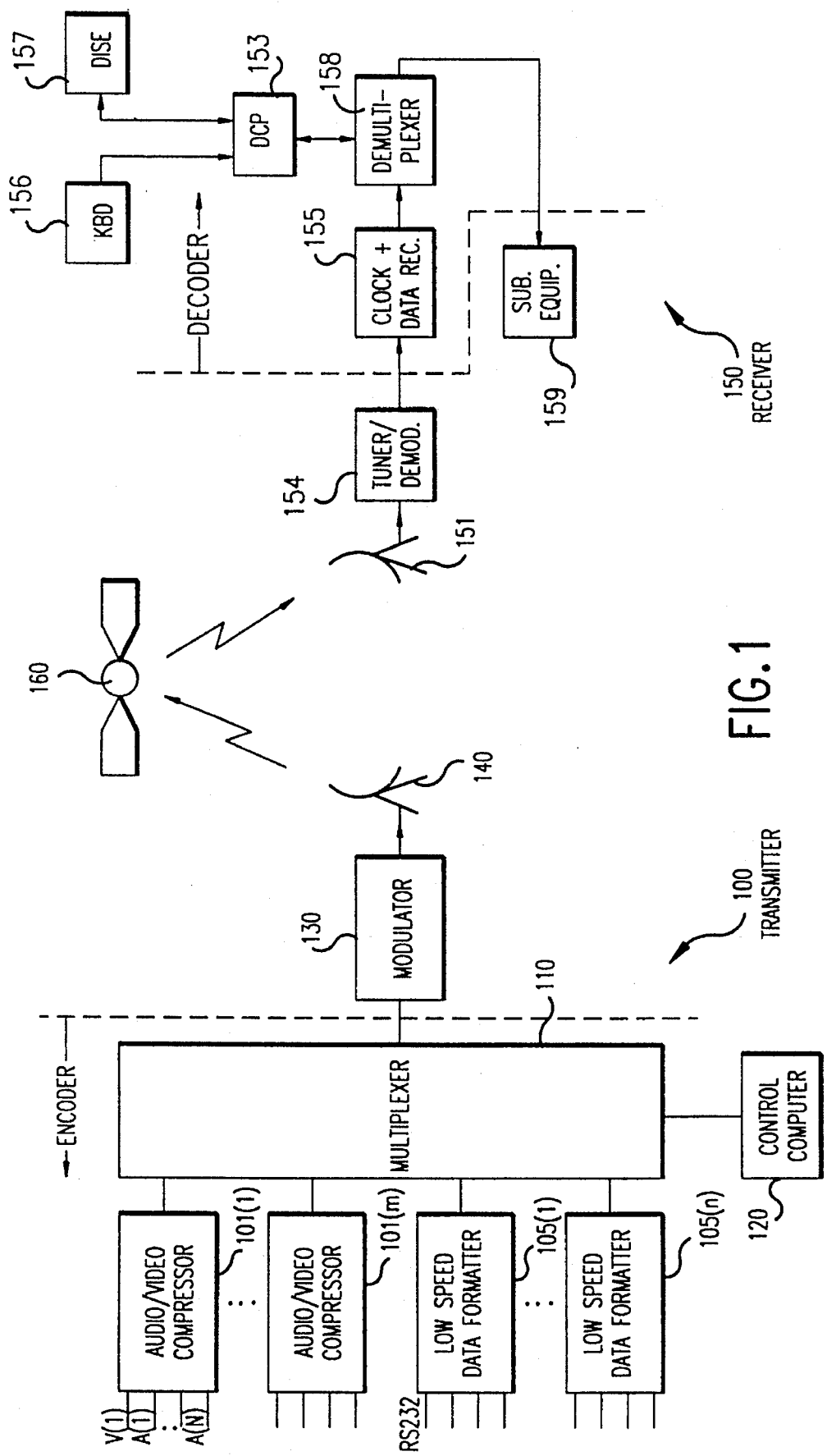
FIG. 1 is a system block diagram showing a transmitter site 100 including an encoder and a receiver site 150 including a decoder according to the present invention for transmitting control, low data rate, medium data rate (audio) and high data rate (video) data implemented in a satellite communications system.

FIG. 1 shows a transmitter site 100 including an encoder and a receiver site 150 including a decoder according to the present invention applied in the environment of a satellite communications system. Audio/video compressor circuits 101(1) to 101(m) are shown for individually receiving audio service data and/or video service data, for example, from a plurality of programmers providing such services. One such MPEG video compressor known in the art is a National Transcommunications, Ltd. (England) NTL 2000 V compressor. Similarly, a plurality of low data rate services, for example, RS232 digital data, are received at low speed data formatters 105(1) . . 105(n). The audio video compressors compress the received medium and high data rate data in accordance with known algorithms (for example, in accordance with currently known or proposed standards such as MPEG I or II, audio or video, in particular, for example, ISO 11171 or ISO 13818).

Control computer 120 supplies control information, preferably as data packets, to the multiplexer 110. For example, the data packets may be constructed by the control computer according to specified formats responsive to the entry of appropriate instructions into control computer 120. Accordingly, the operator can control the various modes of authorization made available by the present invention. Furthermore, control computer 120 may generate teletext data. The teletext data may or may not be compressed.

In addition, control computer 120 controls multiplexer 110 to time division multiplex the compressed medium and high data rate streams output from compressors 101(1) to 101(m) and the low data rate streams output from formatters 105(1) to 105(n) into a serial data stream for output to modulator 130. The high speed data link connecting multiplexer 110 and modulator 130 may be coaxial cable, optical fiber or twisted pair, so long as the transmission is relatively noise free and at sufficient data rate. In a preferred, but nonetheless nonlimiting, embodiment the control information and the data streams are encrypted. Modulator 130 then modulates the multiplexed digital data stream on to a carrier and up converts the carrier as necessary for transmission via, for example, C or Ku band frequencies through a satellite antenna 140. Modulator 130 may preferably comprise a quadrature phase shift key modulator known in the art for satellite transmission. Satellite antenna 140 beams a signal including the modulated data to satellite 160 which may be functionally referred to as a transponder. Transponder 160 simply repeats the received signal toward earth and satellite receiver antenna 151.

Receiver site 150 typically includes a tuner/demodulator 154 for selecting one of a plurality of channels to which satellite tuner/demodulator 154 may be tuned. Tuner/demodulator 154 down converts and outputs a demodulated data stream to clock and data recovery circuit 155. Clock and data recovery circuit 155 in turn outputs an error corrected data stream and synchronization data to demultiplexer 158. Additional information concerning a suitable clock and recovery circuit may be obtained from U.S. patent application Ser. No. 80/160,39, entitled "Method and Apparatus for Locating and Tracking a QPSK Carrier", filed concurrently herewith and incorporated herein by reference. A user may input a selected channel via a selector, e.g. remote control or using push buttons on a panel thereof, etc. The selector will be referred to herein as KBD 156. The channel selection information is sent to display control processor (DCP) 153. Under the control of DCP 153, the demultiplexer 158 outputs control information corresponding to the selected channel to DCP 153.

The control information may be encrypted as discussed above. Accordingly, the DCP 153 supplies the encrypted control information to digital compression inboard security element (DISE) 157. DISE 157 decrypts the control information and determines whether the decoder is authorized to receive the selected channel. If so, the DISE 157 supplies location information and decryption information to the demultiplexer 158 via DCP 153. The demultiplexer 158 locates, demultiplexes (i.e. extracts), and decrypts the data stream and then provides the demultiplexed data streams to various output ports to subscriber equipment 159 via peripheral data processors 152. In one preferred embodiment, the demultiplexer is an application specific integrated circuit (ASIC). Further details concerning the operation of the demultiplexer 158 and the peripheral data processors 152 may be obtained from U.S. patent application Ser. No. 08/161,154, entitled "A MultiService Data Receiver Architecture", filed concurrently herewith and which is incorporated herein by reference. Details of a TTX processor will be discussed in greater detail below.

The user or subscriber equipment may comprise, for example, standard or high definition television reception equipment, digital audio reception equipment, digital data processors or computers, video game equipment, facsimile receiver/printers, energy management equipment and the like.

The receiver site 150 may not only be a subscriber to services but may be a provider of services such as a cable television system operator. In such a scenario, the receiver site 150 may not include typical subscriber equipment 159 but may include cable television system headend equipment known in the art including television modulators and digital audio service providing equipment and the like.

Figure 2A:
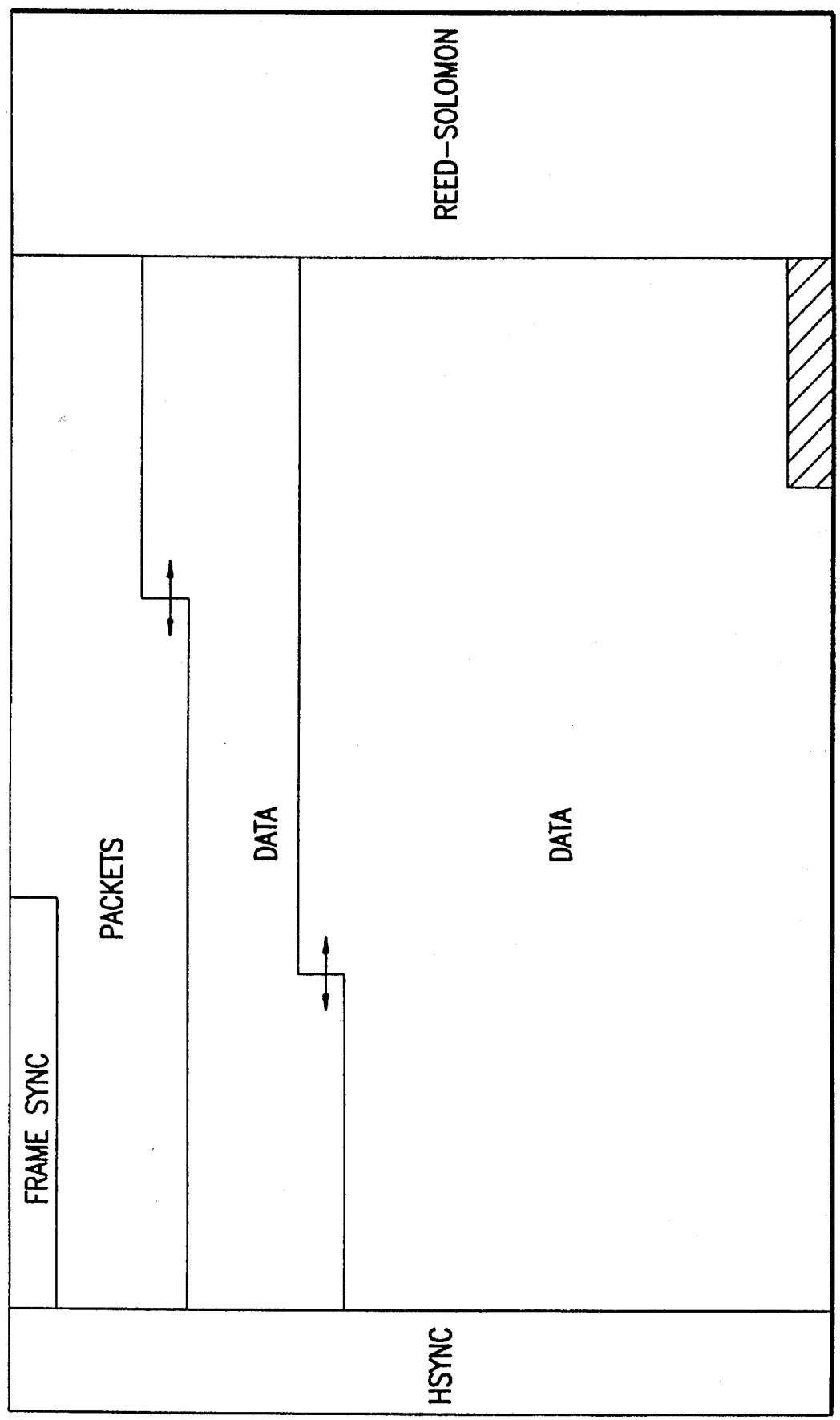
FIG. 2A is a diagram showing a scalable multiplex frame, including synchronization words BLOCK SYNCH (also referred to herein as HSYNCH) and FRAME SYNCH, for transmitting a digital data stream of low data rate (included within PACKETS), medium data rate (audio) and high data rate (video) data protected by Reed-Solomon encoding according to the present invention.

Referring now to FIG. 2A, there is shown a generic frame having highly flexible characteristics. However, it will be recognized that the present invention may be practiced in connection with other data frame structures, whether they are more flexible or less flexible than that described below, without significantly diminishing the advantages of the present invention. The static or fixed elements of the depicted scalable multiplex according to the present invention are BLOCK SYNCH (or HSYNCH) and FRAME SYNC. All other depicted elements of the frame are flexible and may change from medium to medium and from frame to frame. For example, Reed-Solomon error correction parity data may be provided for satellite transmission and omitted for less error prone forms of media.

PACKETS data comprises control information as well as low speed data services, such as, for example, TTX data. Moreover, the delineation between what is shown as PACKETS data and areas for medium speed (audio) and high speed (video) data portions are flexible, and the figure is not intended to show that the boundaries between such forms of data is fixed at any one point in the frame. A predetermined structure is provided to the frame in that FRAME SYNCH follows the first byte of HSYNCH in a frame according to the present invention. PACKETS data follows FRAME SYNCH, followed in turn by medium speed (audio) and high speed (video) data in that order.

There will always be some PACKETS data for control purposes but depending on the priorities of data services to be transmitted there may not exist low speed data portions thereof, medium speed data sections or high speed data sections of a particular frame. A more detailed discussion of the data frame structure is found in U.S. patent application Ser. No. 08/161,160, entitled "System and Method for Transmitting a Plurality of Digital Services Including Imaging Services," filed concurrently herewith and which is incorporated herein by reference. Further details concerning HSYNCH and FRAME SYNCH determination and recovery at a receiver may be found in U.S. application Ser. No. 08/160,841 now U.S. Pat. No. 5,420,640, entitled "Memory Efficient Method and Apparatus for Synch Detection," filed concurrently herewith and incorporated herein by reference.

The term PACKETS is intended to refer to a collection of, for example, control or system data blocks which are intended to signal or control a receiver to, for example, identify the data types or data services and the respective data beginning and ending boundaries to follow. The control data blocks may serve to limit the variety of services available to an end user as well as provide a basis upon which the end user may control his receiver to receive and output data services as he chooses. In other words, according to some applications, the user's selection of services may be limited by their on-hand equipment and their preferences to particular ones of the authorized services in particular arrangements of the various multiplexed data streams or blocks that follow in the data stream.

Low speed data refers to teletext, facsimile, conditional access, alarm, energy management, certain audio and other data streams which typically exhibit data rates of less than sixty-four kilobytes per second. Medium speed data refers to more sophisticated forms of audio such as "surround-sound" and medium speed data rates between, for example, 64 kilobytes per second and T1 carrier or D1 (telecommunications) rates of approximately one megabit per second. High speed data refers to some compressed forms of video transmission up to data rates required for high definition color television, be it in a MUSE, European, so-called Grand Alliance proposed U.S. format or other HDTV format. Such a structure is not intended to be fixed; for example, the present suggested data rates may be broken into only two regions of low and high speed data. Nevertheless, for example, low speed data will always be included within PACKETS data and precede higher speed data sections of the frame, and high speed data will always follow slower speed data and precede the first HSYNCH and FRAME SYNCH words for the next frame.

The size of a particular frame is dictated by the transmission medium and the data to be carried. One of the features of the data frame format discussed herein is a minimization of the number of bytes utilized for authorization of services and a maximization of the payload or information data portions of the frame. Thus, transmitter power and signal to noise objectives are achieved along with information payload maximization. Then, large frames are inherently more efficient, and there is an improved tolerance of long burst errors, for example, in a cable or satellite environment. Other factors weigh against the choice of too large a frame. These include the speed of achieving synchronization at a receiver and the cost of error correction circuitry such as memory costs at a receiver site.

In an error-prone environment, error protection is provided by a Reed-Solomon block code denoted REED-SOLOMON and appearing in FIG. 2A as a narrow but long rectangular column at the right of the figure. As is shown in either FIG. 2A or 2B, the Reed-Solomon block code is appended to the information data bytes as forward error correction (FEC) parity bytes. The proportion of FEC bytes to information bytes is on the order of from one to ten per cent depending on the particular medium or mixture of media or application. Interleaving, wherein bytes of a number of blocks grouped in the depicted frame are shuffled between blocks according to a predetermined algorithm known to transmitter and receiver alike, may be employed to provide additional protection against extended bursts of errors. Further information concerning interleaving may be found in U.S. patent application Ser. No. 08/161,160, entitled "System and Method for Transmitting a Plurality of Digital Services Including Imaging Services," filed concurrently herewith and which is incorporated herein by reference.

A nearly square, but not perfectly square, frame is preferred and thus the practical maximum limit on the vertical dimension is about 512 lines or blocks. In keeping with such considerations and practical limitations on typical media bandwidths, a practical maximum number of video services is on the order of thirty-two and on concurrent audio services, sixty-four, assuming video and audio data compression is utilized without greatly sacrificing received signal resolution.

Figure 2B:
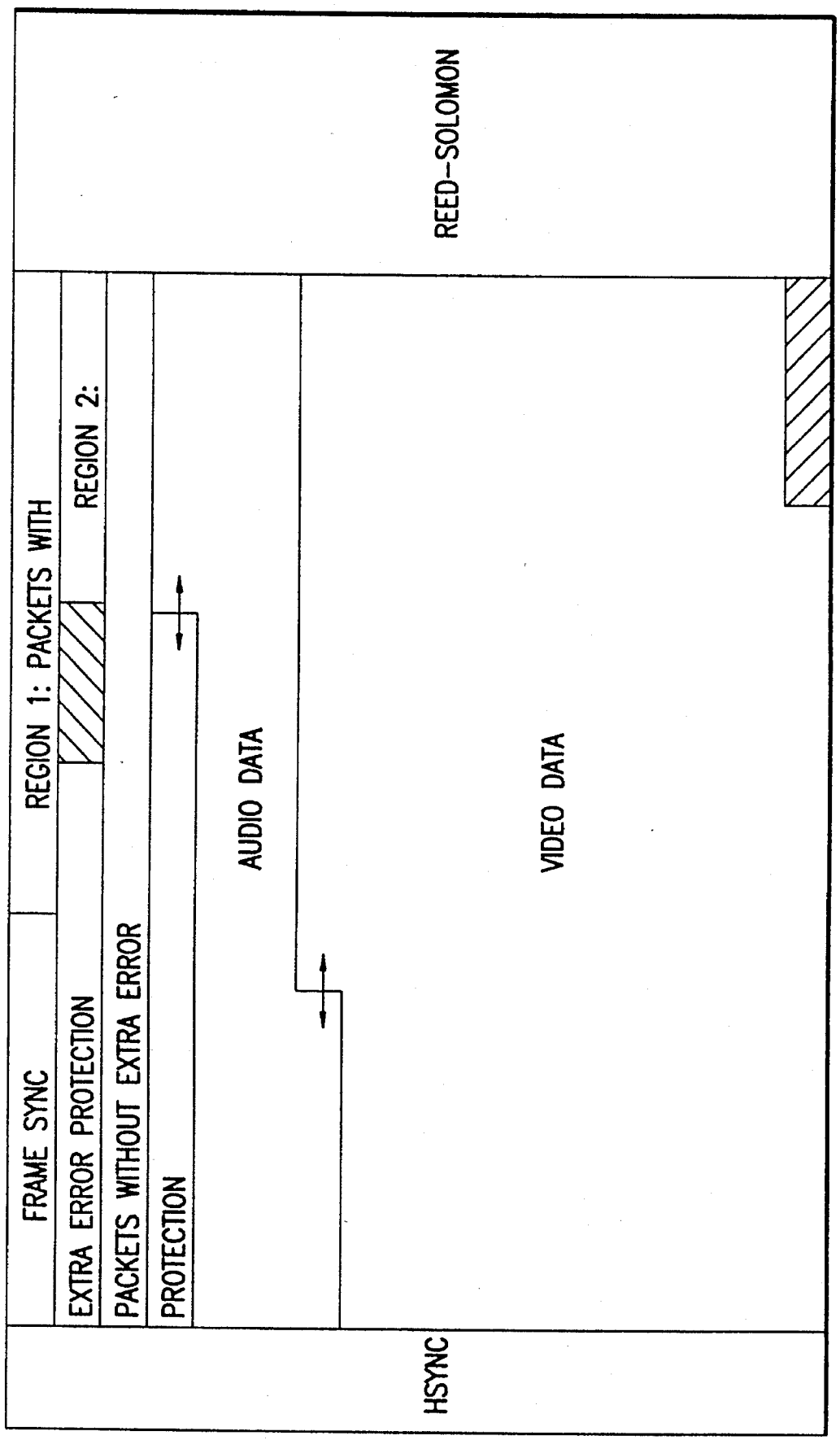
FIG. 2B is a second diagram of the frame of FIG. 2A wherein the PACKETS area is further broken down into first and second regions, the first region including packets with extra error protection and the second region including data protected only by Reed-Solomon encoding.

PACKETS data follows the FRAME SYNC word in the frame. Certain PACKETS data is utilized to identify the number of bytes provided in a frame for a particular service when byte stuffing is required. Referring to FIG. 2B, the PACKETS data portion of the multiplex frame may be said to further consist of two regions: one region including a MUX Structure Control packet requiring additional forward error correction and a second region requiring now additional forward error correction than the Reed-Solomon coding provided for each row or line (excluding HSYNCH).

Other categories of PACKETS data do not require additional forward error correction. These include video and audio control, seed packets for decryption, cyclic system data, composite virtual channel and definition packets for providing what may be perceived as additional data services, addressed data packets for transmitting messages to addressed decoders, teletext and utility data packets and other service packets. Additional details of the various PACKETS data may be obtained from U.S. patent application Ser. No. 08/161,160, entitled "System and Method for Transmitting a Plurality of Digital Services Including Imaging Services," filed concurrently herewith and which is incorporated herein by reference, and U.S. patent application Ser. No, 08/160,830 now U.S. Pat. No. 5,506,904 entitled "System and Method for Transmitting and Receiving Variable Length Authorization Control for Digital Services", filed concurrently herewith and which is incorporated herein by reference.

Figure 2C:
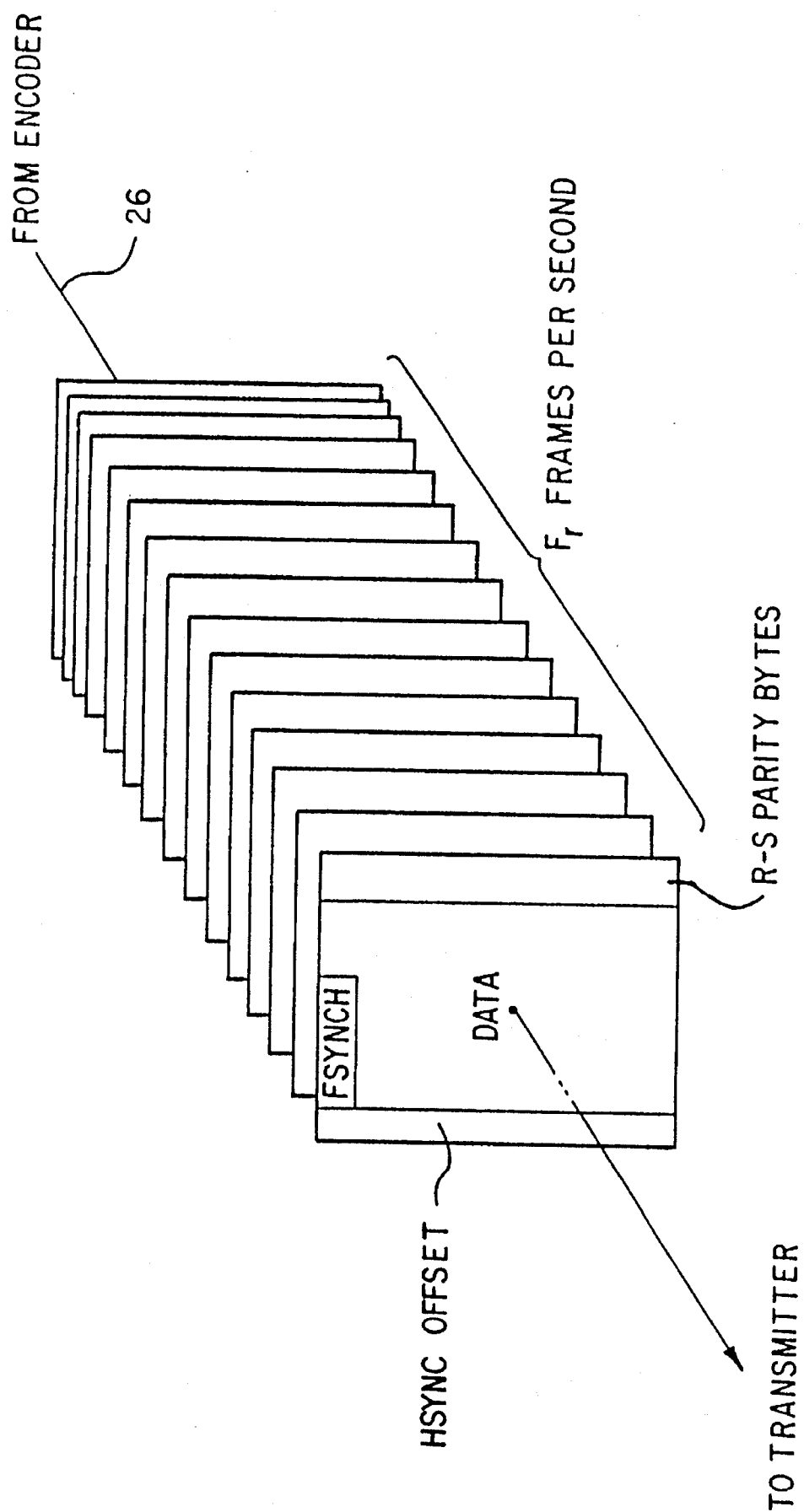
FIG. 2C is a diagram showing that a sequence of frames in the form of FIGS. 2A or 2B are transmitted to a receiver according to the present invention.

FIG. 2C illustrates that a sequence of frames in the form of FIGS. 2A or 2B are transmitted to a receiver according to the present invention. The sequence of frames need not be composed of identical allocation of packets, low speed data, etc. Rather, the content of individual frames may altered by the operator in accordance with the services and authorization control desired.

Figure 3:
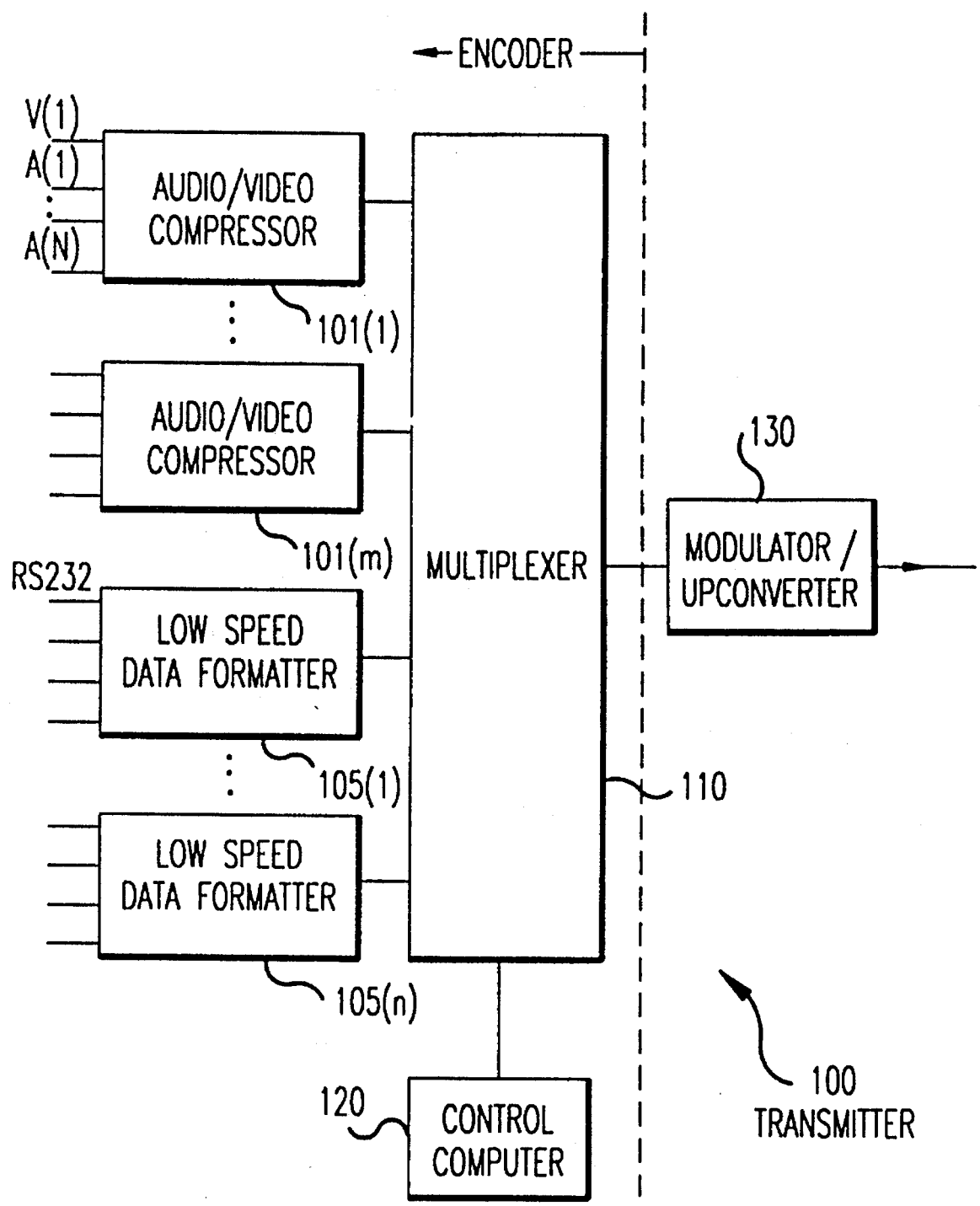
FIG. 3 is an encoder block diagram for one preferred embodiment of a portion of transmitter 100 of FIG. 1 showing the connection of audio and video compressors and low speed data formatters to a multiplexer under control of a control computer for modulation by a modulator on to a carrier for transmission, for example, by satellite as shown in FIG. 1.

Now, an encoder according to the present invention will be further described with reference to FIG. 3. It has already been described that an encoder according to the present invention typically involves A/V compressors 101(1) to 101(m). Particular suggested capacities for one such A/V compressor, for example, compressor 101(1) are to limit the number of input video streams to 1 and to provide up to a maximum of four audio input streams (or two stereo streams) each comprising left and right input streams.

It has also been described that low speed data formatters 105(1) to 105(n) be provided. Typically, however, each low speed data formatter may handle, for example, sixteen or even thirty-two input data streams. Consequently, it is contemplated that the number of such formatters required will number only 1 or 2. However, any number of low speed data formatters may be implemented consistent with the principles of the present invention. Low speed data formatters typically receive low speed data in a predetermined format, such as RS232, and strip the data of any header data, start data, stop data, parity data and such depending on the predetermined and identified input data stream so that only true information carrying data remains in a serial data stream.

Figure 4:
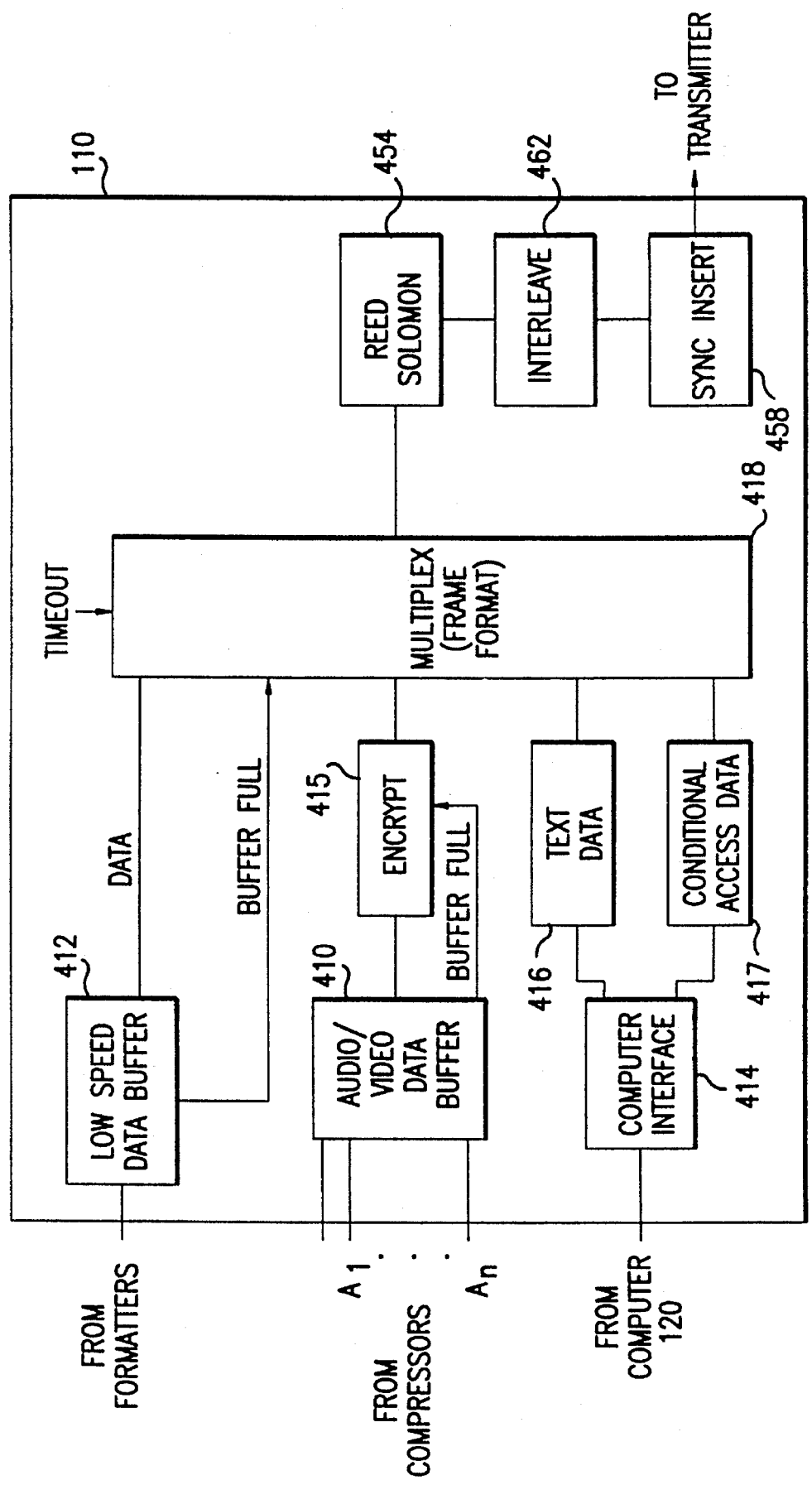
FIG. 4 is a detailed schematic block diagram of a multiplexer 110 of FIGS. 1 or 3 according to the present invention for outputting multiplexed data according to the multiplex frame format of FIGS. 2A, 2B and 2C.

Now, the multiplexer 110 of FIG. 3 will be described in further detail with reference to FIG. 4. Audio/video service streams A1 to An are received from audio/video compressors at audio/video data buffer 410. Service multiplexer 110 operates to multiplex a plurality of digital service streams for transmission to remote locations. Also shown are inputs to a low speed data buffer 412 from low speed data formatters 105(1) to 105(n). Buffer 410 (audio/video) and buffer 412 for low speed data preferably signal a buffer fullness condition to the next functional element, for example, encryption block 415, if encryption is desired, or on to multiplex frame formatter 418 for low speed data. Encryption block 415 is intended to represent the inclusion of, for example, single or double tiers of encryption in accordance with seeds and keys and particular, predetermined algorithms as required for the digital service streams, for example, in a pay environment.

Other digital data is input from a text/graphics input computer, for example, teletext data to text data processor 416 via computer interface 414 to the service multiplexer 418. Conditional access data is input, for example, from a billing computer or subscriber service computer for storage in conditional access data buffer 417. Conditional access data typically defines the services, especially pay services, to which a subscriber has subscribed. This data interfaced also via interface 414 is processed and packeted into protect region 1 PACKETS via conditional access data processing block 417 for input to multiplex formatter 418.

Thus, at the output of multiplex (MUX) block 418 is a multiplexed frame structure as described by FIGS. 2A, 2B and 2C. The output digital stream is Reed Solomon encoded according to an appropriate encoding scheme depending on the noise characteristics of the transmission media by a well known Reed Solomon encoder 454. Then, preferably in a highly noisy environment, the frame is interleaved on a byte(s) (rows and columns switching) basis at interleave block 462. Interleave circuit 462 interleaves the data frame by transposing row and column addresses of data within the frame. Lastly, HSYNCH and FRAME SYNCH are inserted into the frame just prior to transmission at synch insert block 458. This data then appears at a receiver at its original location in the frame while all other data is interleaved.

The format of the TTX information will now be described. The TTX system supports two types of TTX packets: a header row packet and a data row packet. The header row packet defines the characteristics of the data row packet(s) that follow it. In a preferred embodiment, the data row packet comprises 40 8-bit characters. Of course, the present invention is not limited in this respect. One of skill in the art will recognize that an alternative number of characters as well as an alternative number of bits per character can be implemented.

FIG. 5 illustrates a preferred configuration of a header row packet. The specific fields and bit allocation should not be considered to limit the present invention. The PACKET TYPE field identifies the packet as a teletext header packet. Accordingly, a filter (not shown) in the demultiplexer 158 can extract a TTX header packet from other data. DECODER TYPE enables "filtering" based upon decoder type in the event that different types of decoders are used in the system. The concept of filtering in connection with the present invention will be discussed in greater detail below. The ENCRYPT FLAG indicates whether the page is encrypted or not. Accordingly, the decoder can determine whether or not to decrypt the teletext data by the ENCRYPT FLAG. The FORWARD LINK FLAG and the BACKWARD LINK FLAG indicate respectively whether the page is forward and backward linked. A value of "1" for any of ENCRYPT FLAG, the FORWARD LINK FLAG, and BACKWARD LINK FLAG may represent enablement of the feature and a value of "0" may represent a disablement of the feature. Of course, it will be recognized that any particular protocol is acceptable so long as the transmitted information is properly understood at the decoder.

The BOX MODE indicates whether or not a page is displayed on the subscriber's viewing screen in a box. If a page is boxed, the portion of the screen surrounding the text may be specified to be black or video. In one preferred embodiment, two bits are assigned to BOX MODE. Of the two bits, a BOX ENABLE bit indicates whether BOX MODE is enabled and a BOX BACKGROUND bit indicates whether the background is black or video.

As pages are placed onto transmission an increasing portion of TTX bandwidth is occupied. This is particularly true where teletext support of multiple services is provided. As a result, the grab time for specific pages is increased. The START ROW field reduces the number of rows that are required to be transmitted per page by specifying the first non-empty row. Accordingly, transmission bandwidth need not be wasted transmitting the empty rows at the top portion of pages such as, for example, caption pages which usually only have a single row of text near the bottom of the screen.

START ROW further implements a page annotation feature of the present invention, which reduces the transmission requirements for pages that have empty rows embedded within text rows. In addition to indicating the first non-empty row of text, START ROW indicates the row in which all subsequent text rows are to be placed. Therefore, empty rows between rows of text on a page may be omitted by including a second header row packet with the new START ROW. The annotation header row packet is differentiated from the page header row packet by a single bit START FLAG. When START FLAG is, for example, "1" the header is a page header indicating that a new page is about to be received and all page memory should be cleared. Any subsequent headers with START FLAG having a value, for example, of "0" are annotation headers and cause all subsequent text rows to be annotated onto the page in the appropriate row indicated by START ROW. Thus, START FLAG signals whether the particular page is a new page or an annotation page. Examples of the use of the START ROW and START FLAG fields in connection with start pages and annotation pages are provided below.

One of a plurality of character sets (e.g., 32 in one preferred embodiment) may be selected using the CHARACTER SET field. The PAGE NUMBER field enables the decoder to select pages of text according to page number. Thus, the transmitted PAGE NUMBER can be used to filter a transmission so that only the requested page of text is grabbed. Accordingly, PAGE NUMBER may be considered a filter field for purposes of the present invention.

One preferred teletext header that includes eight aggregate filter fields (also referred to herein as filter fields) will be discussed below. However, the number of aggregate filter fields may vary depending on the requirements, for example, of the operator, the system, or the subscriber. The eight general purpose aggregate filter fields FILTERS 1–8 are available to allow the broadcaster and decoder to selectively screen the teletext pages. These eight fields may be defined by the broadcaster as desired. Each aggregate filter field has an associated value.

By way of example, several preferred uses of the filter fields are discussed below. FILTER 1 may be a service number filter having, for example, an 8-bit value for allowing pages to be designated for specific services within a service category (e.g., TV service #1 may have a different teletext page than TV service #2). FILTER 2 may be a time zone filter having, for example, a 3-bit value that allows time zone specific data to be retrieved by the decoder. The broadcaster may specify that any text page is time zone specific at the time of broadcast. For example, the broadcaster may wish to transmit text reporting a 3:00 PM Eastern Standard Time start time of a particular show for display only at televisions within the region using Eastern Standard Time. If FILTER 2 is not enabled (i.e., the text is not time zone specific), the text page will be grabbed by decoders regardless of the time zone. When enabled, the encoder could use an additional header to annotate the time and date row onto a previous time zone independent page of text. The time zone of the decoder may be programmed into the DISE, and may be changed by the broadcaster using an addressed data packet (ADP) specific to the decoder.

A text page may be further designated according to service category, for example, TV, radio, data, etc., using FILTER 3. FILTER 3 has 5-bits in the instance illustrated in FIG. 5. By way of example, a TV service may have a specific black out page which is different from radio, data, or text blackout page. By enabling FILTER 3 and assigning each service category a specific code, a TV service specific black out page can be achieved.

FILTER 4 and FILTER 5 may be used to designate information specific to language or security element using, for example, 4 bits and 1 bit, respectively. A subscriber may enter a desired language for service in the decoder via a keyboard. Moreover, each decoder may have a decoder type definition programmed as a fixed value in its decoder internal security element (DISE). Accordingly, the decoder filter field would be responsive to the programmed decoder type definition. By using FILTER 4 and FILTER 5, the text page would only be displayed at decoders having a matching language and security element filter. Additional FILTERS 5–8 may be used for other purposes selected by the broadcaster. Alternatively, one or more FILTERS could be reserved for future purposes.

A powerful advantage of the present invention is the ability to combine filters to enable the broadcaster to control which subscribers receive a particular page of text. For instance, a page of text may represent a video black out page for display by French language, Eastern Standard Time decoders. Alternatively, menu pages that are common to all services and time zones may be transmitted.

A FILTER ENABLE byte is preferably included to indicate which of FILTER 1–8 are enabled. For example, FILTER ENABLE may have a bit that corresponds to each of the available filters. A "1" may indicate that a particular filter is activated and a "0" may indicate that the filter is disabled, or vice versa. When a FILTER ENABLE bit indicates that the corresponding filter is activated, the teletext page will be grabbed only if the value in the designated FILTERS 1–8 match a corresponding filter value stored in the decoder. When a FILTER ENABLE bit indicates that the corresponding filter is disabled, the teletext page is grabbed if all other enabled filter values match. Of course, the FILTER ENABLE field may be implemented in numerous other ways.

A TEXT ELEMENTAL STREAM NUMBER field is used by the encoder to indicate the physical text service number used for encryption. The physical text service number, encryption, and decryption will be discussed further below. This field is ignored when the ENCRYPT FLAG indicates that there is no encryption. The decoder may use the TEXT ELEMENTAL STREAM NUMBER field to determine seed validity if required.

FIG. 6 illustrates one preferred embodiment of a teletext data row packet. The PACKET TYPE field identifies the packet as a teletext data row packet. Accordingly, a filter (not shown) in the demultiplexer can extract a teletext data row packet from other data. DECODER TYPE enables filtering based upon the type of decoder. The remainder of the teletext data row packet may be allocated for teletext data. For example, 40 8-bit characters (i.e. 320 bits total) may comprises a teletext row. However, this is intended merely as an example. The number of total bits (which would determine the number of characters if the number of bits per character were fixed) and the number of bits per character may vary in accordance with the present invention.

The encoder may be configured to construct the TTX header and data row packets as discussed above. The reception of TTX information by the decoder will now be discussed. The demultiplexer 158 determines whether a received packet is a teletext packet (TTP) as opposed to another packet according to its packet type information. The entire TTP is extracted from other packets and is transmitted to a Micro-processor and Teletext (PMS) section of the demultiplexer 158. One of the functions of the PMS may be to perform multiple page grabs of teletext pages. The PMS must be able to handle the maximum data rate without losing any data. It is preferred that all TTPs have the same length.

Difficulties handling the received TTPs having different lengths may arise if the demultiplexer 158 expects the header in a specific location.

The demultiplexer 158 compares the page number of the header row packet with a requested page number. A particular page number may be requested as a consequence of a subscriber's channel selection, for example, or automatically by the decoder upon the occurrence of an event. If the requested page number is found in the received data, the text data packets that follow the header row packet are written into a memory, e.g. a random access memory (RAM), until a new header packet is received. The demultiplexer 158 can store 16 text pages including header row data and have four page number comparators in one exemplary embodiment. When a page has been received and written to RAM, a page grabbed status flag will be set for the DCP 153.

The DCP 153 command structure may comprise a page grab command, page number, compare register number (e.g., 0–3), and RAM page to write to (e.g., 0–15). Status read commands return the current status for the outstanding page grabs and thereby permit the DCP to monitor the status of page grabs. The DCP 153 and the demultiplexer 158 have access to the text header flags using a Read RAM command.

The text header may also include filter values for category, service, time zone, language, security element, etc. Each of these fields can be enabled or disabled via the filter enable flags. The demultiplexer 158 sets a row counter to the starting row number in the header row packet. The demultiplexer will not modify current data in the previous text rows to ensure proper page construction. If the text page requires space characters in the previous rows, either the encoder may transmit a full page or the DCP may issue a clear page command. The demultiplexer then checks for page overflow to ensure that is does not write into the next text page in RAM.

Row annotation and filtering may cause pages to be reconstructed row by row in no particular order. A single row may be erased, created, and overwritten before a page is reconstructed. If a page is also being displayed at the same time it is reconstructed, the display may behave erratically. While reconstruction is in progress, rows may appear, disappear, and then reappear with different data. The rate at which this occurs depends on the number of annotation rows required to construct the page.

To avoid this difficulty, the DCP 153 may implement page swapping thereby ensuring that reconstruction and display of a page do not interfere with each other. The DCP 153 may request page grabs only to a RAM that is not on display. Once the page has been grabbed, the demultiplexer 158 must discontinue grabbing the page and inform the DCP 153 that a grab is completed. The DCP 153 can then cause the completely reconstructed page to be displayed and initiate another grab into a non-displayed RAM. By reissuing the grab, the DCP 153 implements a continuous grab.

The demultiplexer 158 must be capable of automatically stopping a page grab as soon as a page has been reconstructed. If it were to continue to grab the page, the DCP 153 could cause the page to be displayed while it is being reconstructed. The indication to the DCP 153 that the page grab has been completed should only be set when a complete page has been reconstructed. This is indicated in the demultiplexer 158 by a matching header row (i.e., a header row having the correct page number and filter values) with the START FLAG set followed by another header row with a START FLAG set.

The ENCRYPT FLAG indicates that the current annotation page is encrypted. Without limiting the invention, the encryption may be conducted on an annotation page by annotation page basis. Encryption may be performed only on data rows following the header row, and a complete page may consist of encrypted and non-encrypted rows. The DCP 153 will load the text decryption seed every session. When the demultiplexer 158 finds the page header, it loads the current text seed for the session and decrypts the entire page. Accordingly, the text data may be stored in the clear in the RAM.

The display support, logic used to display a page onto a television screen, for example, controls the text data to be sent to the character generator. It also controls the display attributes requested by the DCP 153 or from the TTX header row packet. The character set number allows selection from several font ROMs. For example. a 5-bit number may be used as upper address bits in addition to an 8-bit text data. Thus, the CHARACTER SET field of the header row packet may form part of an address for retrieving a particular character in a particular font from ROM.

FIG. 7 illustrates an exemplary embodiment of multiple page grab logic 700 of a demultiplexer 158. The multiple page grab logic 700 comprises page grabbers 710-1 to 710-n, page display logic 750, and page display random access memory (RAM) 760.

After extraction from the multiplexed signal in another portion of the demultiplexer 158, a received TTX header row packet 705 is sent to each of the page grabbers 710-1 to 710-n. However, different page grabbers may grab different pages according to the requested page and/or requested filter values supplied thereto by the DCP. Different requested page and/or requested filter values may be applied to each page grabber in order to control the page grabbers to grab different pages. Each of the page grabbers 710-1 to 710-n may be identical in structure and operation. Accordingly, the description of the operation of page grabber 710-1 below is equally pertinent for any of the other page grabbers and a specific discussion of page grabbers 710-2 to 710-n will not be provided herein.

Page grabber 710-1 comprises a page comparator 715-1, AND logic circuit 720-1, aggregate filter comparator 725-1, page grab logic 730-1, decryptor 735-1, and page construction random access memory (RAM) 740-1. The AND logic circuit 720-1 and the page grab logic 730-1 may together be considered a page grab logic circuit. Assuming that the received TTX header row packet is supplied to page grabber 710-1, the PAGE NUMBER field is supplied to the page comparators 715-1 where it is compared to a requested page number. The page comparator outputs a matching signal to an AND logic circuit 720-1 on the basis of the comparison to indicate whether or not a match occurred. In addition, the FILTER field and the FILTER ENABLE field of the received TTX header row packet are supplied to an aggregate filter comparator 725-1. The aggregate filter comparator 725-1 compares the FILTER field values with requested filter values and compares whether the particular filter is enabled at all. The aggregate filter comparator 725-1 outputs a matching signal to AND logic circuit 720-1 on the basis of the comparison to indicate whether or not a match occurred. Details concerning the determination of an output value for an aggregate filter comparator are provided below in connection with FIGS. 9 and 10.

If, for example, both the page comparator 715-1 and the aggregate filter comparator 725-1 indicate a match, the AND logic circuit 720-1 outputs a first signal, e.g., a "1", to the page grab logic 730-1. If, however, either the page comparator 715-1 or the aggregate filter comparator 725-1 do not indicate a match, the AND logic circuit 720-1 outputs a second signal, e.g., a "0", to the page grab logic 730-1.

In addition to receiving the output from the AND logic circuit 720-1, the page grab logic receives various other fields of the received TTX header row packet, such as PACKET TYPE, START FLAG, and START ROW. The TTX data stream, which may be comprised of the data row packets, is decrypted in decryptor 735-1 and then supplied to the page grab logic 730-1. The page grab logic 730-1 determines on the basis of the signal from the AND logic circuit 720-1 whether the received TTX header row packet describes a teletext information it should grab. If not, the next TTX header row packet is interpreted.

If TTX header row packet describes teletext information that should be grabbed, the page grab logic 730-1 implements a state machine that is used to maintain the page construction in page construction RAM 740-1. After extraction from the multiplexed signal by a portion of the demultiplexer, TTX data stream is applied to the multiple page grab logic 700. Page construction RAM 740-1 is constantly updated with data from the TTX data stream that is supplied via the page grab logic 730-1. As the TTX data stream is received, the header row packet is interpreted by page comparator 715-1, aggregate filter comparator 725-1, and page grab logic 730-1. The information from the header row packet 705 is used by page grab logic 730-1 to generate read/write commands, RAM enable commands, and address information that place subsequent data rows into the correct address in page construction RAM 740-1 to form the portion of the teletext page defined by the teletext header row packet.

Update of the page construction RAM 740-1 stops when the requested page is completely grabbed. At this time the page grab logic 730-1 sends a "grab complete" signal to page display logic 750. The grab logic 730-1 then releases control of the page construction RAM 740-1. The page display logic 750 controls the page construction RAM 740-1 using read/write commands and RAM enable commands to copy the page into page display RAM 760. The constructed page may then be displayed from page display RAM 760. For example, a character generator may read the data out of RAM 760 and access corresponding pixel data in a ROM (not shown). The character generator must generate the appropriate address information to access the RAM and ROM.

This implementation of multiple page grab logic 700 offers maximum flexibility since each page is supplied with the complete set of logic required to grab that page. As a result, each page grab does not affect any others.

Figure 8:
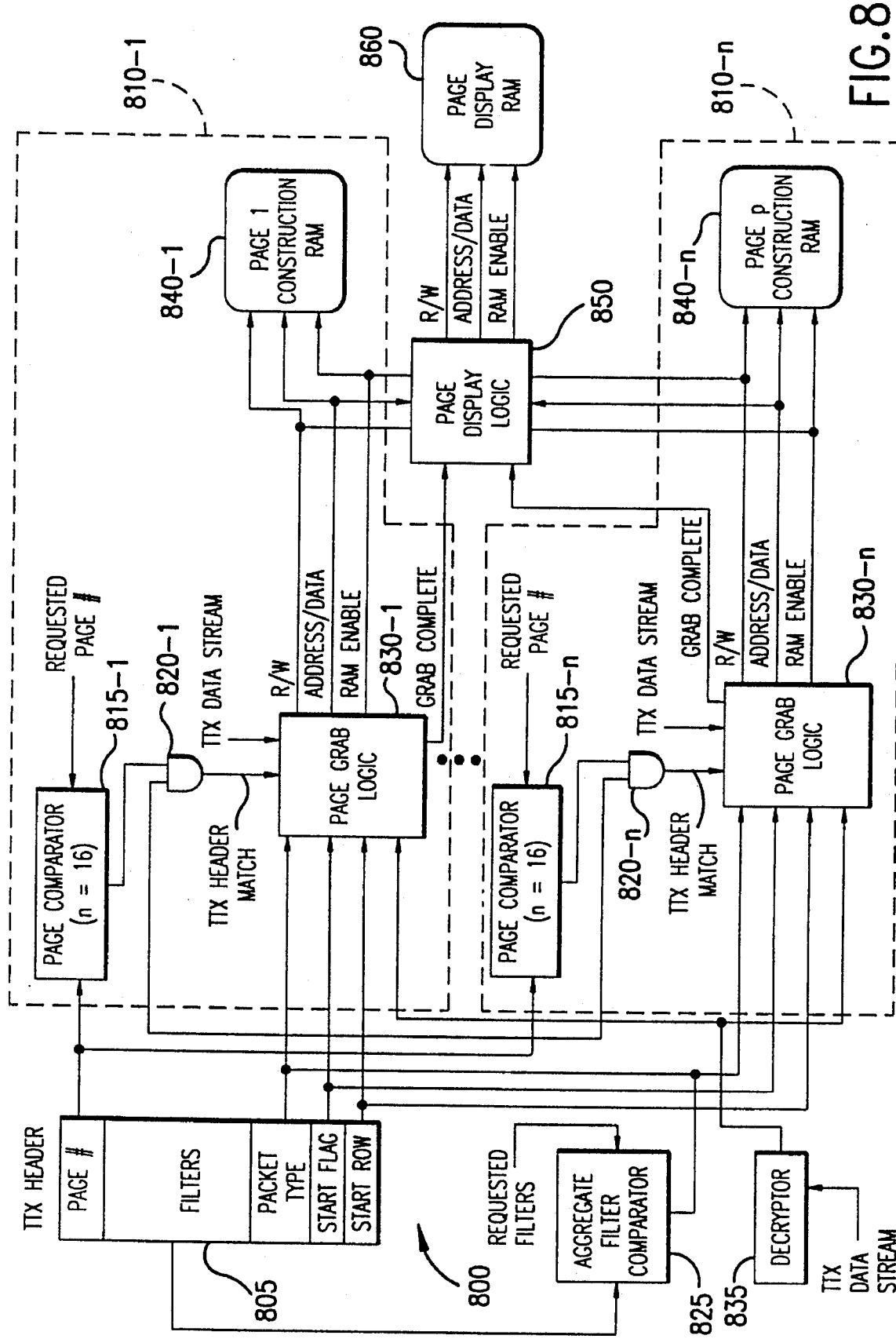
FIG. 8 illustrates a second embodiment of multiple page grab logic in the teletext system.

FIG. 8 depicts an alternative embodiment of multiple page grab logic. The multiple page grab logic 800 includes page grabbers 810-1 to 810-n, aggregate filter comparator 825, decryptor 835, page display logic 850, and page display RAM 860. Page display logic 850 and page display RAM 860 operate in the same manner as described in connection with FIG. 7. Each page grabber includes a page comparator 815-1, AND logic circuit 820-1, page grab logic 830-1, and page construction RAM 840-1. As above, AND logic circuit 820-1 and page grab logic 830-1 may together be considered to form a page grab logic circuit. Each of the page grabbers 810-1 to 810-n share an aggregate filter comparator 825 and a decryptor 835. As a result, multiple page grabs can only be achieved if each page to be grabbed is encrypted in the same way and has the same filter settings. The multiple page grab logic 800 otherwise functions in a similar manner to multiple page grab logic 700.

In the above description, any number of page grabbers may be implemented. For example, four page grabbers may be used in one preferred embodiment.

Figure 9:
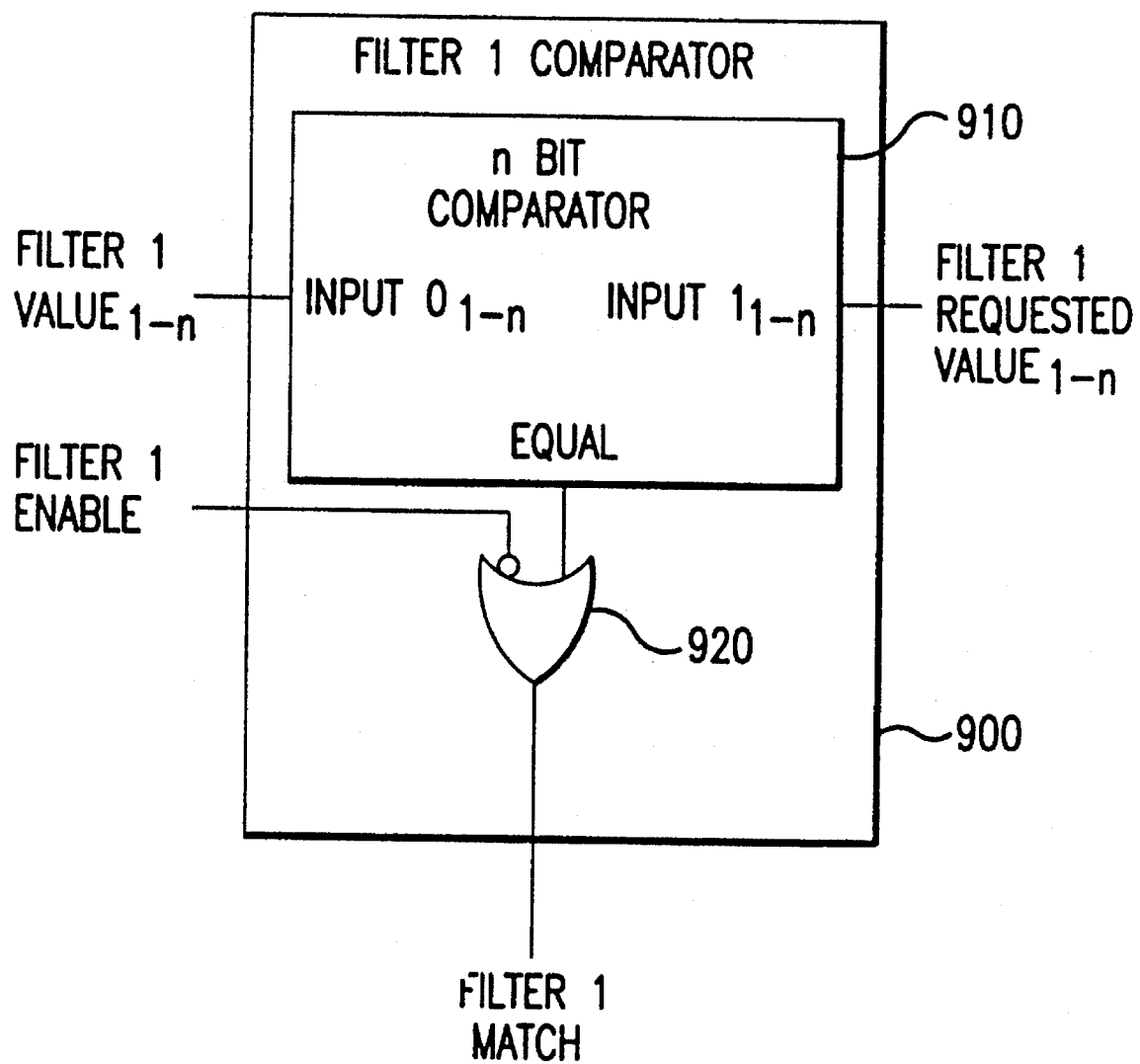
FIG. 9 illustrates one preferred embodiment of a filter comparator.

FIG. 9 depicts an example of a single filter comparator 900 that may be used in aggregate filter comparator 725-1 to 725-n and 825. The single filter comparator 900 comprises an n-bit comparator 910 and an OR logic circuit 920. The n-bit comparator 910 receives an n-bit filter value from the received TTX header row packet and an n-bit filter requested value. As discussed above, the filter requested value may be input by the subscriber or read out of a memory in the decoder. The filter requested values may have been read into the memory pursuant to an instruction from the operator, the subscriber, or on the basis of the hardware implemented by the decoder. The n-bit comparator 910 outputs a first signal, e.g. "1" if the received filter value matches the requested filter value and outputs a second signal, e.g. "0" if there is no match The OR logic circuit 920 receives the output of the n-bit comparator at a first input terminal and receives a filter enable bit from the received header row packet at an inverted second input terminal. The OR logic circuit 920 will output a matching signal indicating a "filter match" if either the filter is disabled or if the n-bit filter value matches the n-bit filter requested value. Otherwise, the OR logic circuit will output a "filter not matched" signal. Of course, it should be clear that OR logic circuit may be replaced with other logic circuits to produce the similar results if the protocol used by the n-bit comparator 910 and/or the filter enable bit were different.

Figure 10:
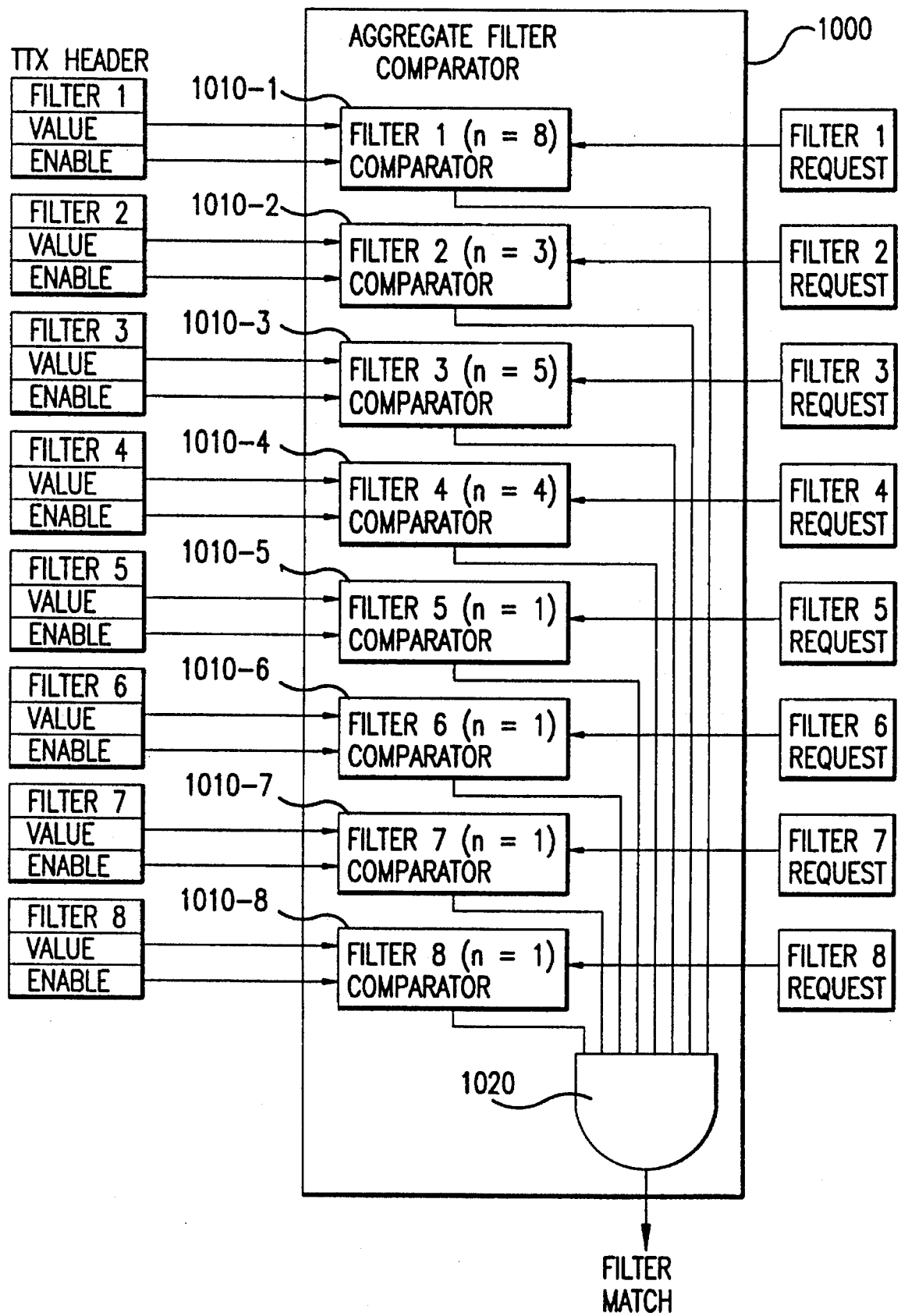
FIG. 10 depicts one preferred embodiment of an aggregate filter comparator depicted in FIGS. 7 and 8.

FIG. 10 illustrates a specific embodiment of an aggregate filter comparator 1000 such as that depicted as 725-1 to 725-n in FIG. 7 or 825 in FIG. 8. The aggregate filter comparator 1000 is shown as comprising eight separate filter comparators 1010-1 to 1010-8 and an AND logic circuit 1020. Each filter comparator 1010-1 to 1010-8 may be of the type depicted in FIG. 9. Of course, the use of eight filter comparators is intended as an example, and any number of separate filter comparators may be implemented consistent with the present invention. Each filter comparator 1010-1 to 1010-8 receives corresponding filter values, a filter enable value, and filter request values. FIG. 10 provides an example of the number of bits received by each filter comparator. However, the number of bits shown is intended to match the TTX header row packet shown in FIG. 5 and should not be considered limiting. The output of each filter comparator 1010-1 to 1010-8 is supplied to an input terminal of AND logic circuit 1020. The AND logic circuit 1020 outputs a matching signal indicating "aggregate filter match" or a signal indicating "aggregate filter not matched."

As discussed in connection with FIG. 9, if an individual filter comparator 1010-1 to 1010-8 detects that either the filter is disabled on the basis of the filter enable signal or that the filter values match the requested filter values, it outputs a "filter match" signal, e.g. "1". Otherwise, the filter comparators 1010-1 to 1010-8 output a "filter not matched" signal, e.g. "0". Thus, the AND logic circuit 1020 outputs an "aggregate filter match" signal if each individual filter comparator 1010-1 to 1010-8 outputs a "filter match" signal. If, however, any one of filter comparators 1010-1 to 1010-8 outputs a "filter not matched" signal, the AND logic circuit 1020 will output a "aggregate filter not matched" signal. As above, AND logic circuit 1020 may be replaced by other logic circuits depending on the signal protocol used.

The configuration of the digital multiplex allows for dynamic creation and deletion of virtual channels. The filters of the TTX system allow the broadcaster to dynamically configure the TTX according variety of classifications, for example, language, service category, service number, time zone, and security element. Of course, the TTX system may be configured based on other distinctions that the broadcaster may find desirable. It is important to understand that the filters are definable by anyone who operates the system. Accordingly, the operator may use the filters to control which subscribers receive particular text and which subscribers do not.

Furthermore, by constructing appropriate TTX pages, the TTX system of the present invention is capable of offering the following functions: network control including menu, help, and decoder authorization status pages; teletext programs, which are primarily teletext program offerings, for example stock reports, weather reports, etc.; teletext for non-teletext programs such as teletext captioning or business television (BTV) type teletext; broadcast or general messages, for example broadcast of a teletext page to all decoders; transmission of personal messages such as teletext pages targeted to a specific decoder or group of decoders; and an electronic program guide.

The decoder is such that it always attempts to specify a requested page using the finest "granularity." In other words, the demultiplexer will attempt to grab a page using the highest specificity of requested filter values, such as specific language, specific service category, specific service number, specific time zone, specific security element, etc. A filter allows the broadcaster to dynamically override the requested filter values by proper selection of filter values in the transmitted signal.

At the encoder, each TTX page may tagged as specific (i.e., filter enabled) or global (i.e., filter disabled) for each of the filters. A global page is grabbed by the decoder no matter what the filter values are. In other words, the filters are disabled for a global page. A specific page is grabbed only by decoders that have matching filter values. By selectively transmitting global or specific pages, the broadcaster may control what gets displayed by a decoder when it grabs a page.

Furthermore, the operator can reconfigure the filter by creating pages that allow a subscriber to make a selection. For example, a operator can allow subscribers to select between Spanish language and English language text by creating a menu page inviting the subscriber to make a selection. The transmitted Spanish page can be transmitted with a different filter value than the English page. Responsive to the subscriber's selection, the page grab logic will grab the page having the selected filter value.

The following examples are designed to illustrate the operation of a filter system for implementing a tiered television service network. In a simple case, the network comprises one television service that is authorized by tiers. No other authorization features (such as blackout, per-per-view (PPV), impulse pay-per-view (IPPV), free time, etc.) are supported. The minimal TTX support may consist of the following three TTX pages: "No KOM" (KOM refers to the "key of the month" which is a basic authorization control); "Service Tier Not Authorized"; and a main menu. All filters would be disabled for these pages thereby allowing every decoder to receive them.

Figure 11:
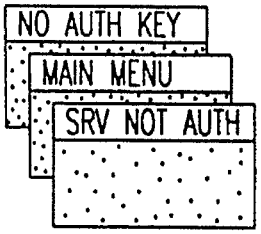
FIG. 11 depicts an example of a television service configuration according to the present invention.

FIG. 11 illustrates the network consisting of one television service having the three TTX pages. Each column represents a filter, in this case service category, service number, and time zone. Of course any number and type of filter may be added depending upon the type of classification the operator wishes to set up. The global column represents the condition where the filters are disabled. FIG. 11 may be considered to represent the situation where other available filters are disabled.

Figure 12:
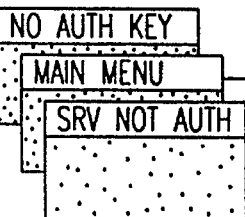
FIG. 12 depicts an example of a television and radio service configuration according to the present invention.

FIG. 12 illustrates an example where a single radio service is added to the network of one television service depicted in FIG. 11. The TTX configuration may be modified to allow for both television service and radio service categories. While the "No KOM" and "main menu" pages remain global pages, a "Radio Authorized" page is created and the "Service Tier Not Authorized" page is made into two pages: a "TV Service Not Authorized" page and a "Radio Service Not Authorized" page. The creation of the category specific "Service Not Authorized" pages is accomplished by creating the two pages and enabling the category filter accordingly.

The "Service Not Authorized" pages may be created in several ways. The simplest way-is to create two independent images for the two pages. While more complicated, it is more efficient in terms of transmission bandwidth to create a global "Service Not Authorized" template page and two annotation pages that are particular to the services. The global template page would hold the portion of the page that is common to both service categories, for example, "You Are Not Authorized For." The annotation pages hold the TTX rows that are specific to the service, such as "The Prime Movie Channel" for the television service category or "Easy-Listening Radio" for the radio service category. An example of such pages is depicted in FIGS. 13A and 13B. A third way to create the "Service Not Authorized" pages is to create a global page that is specific to one of the service categories, e.g. a "The Prime Movie Channel Is Not Authorized" and create annotation rows that overwrite the television specific portions of the global page with radio specific text. Accordingly, the global page acts as a default page in the event that a specific selection is not made by the system operator.

With reference to FIGS. 13A and 13B, it can be seen that row 8 contains the common row and therefore constitutes the global category page. It is marked as protected on the global level in the left column, and thus cannot be changed by operators authorized only to create pages for television or radio. All other rows may be filled with category specific text. In the examples of FIGS. 13A and 13B, only row 9 holds category specific text.

The transmission of the pages for FIGS. 13A and 13B require only six (6) rows of TTX: a header row and a data row for the global category, a header row and a data row for the television category, and a header row and a data row for the radio category. A format for the TTX rows is illustrated in FIG. 14.

Figures 15, 16A:
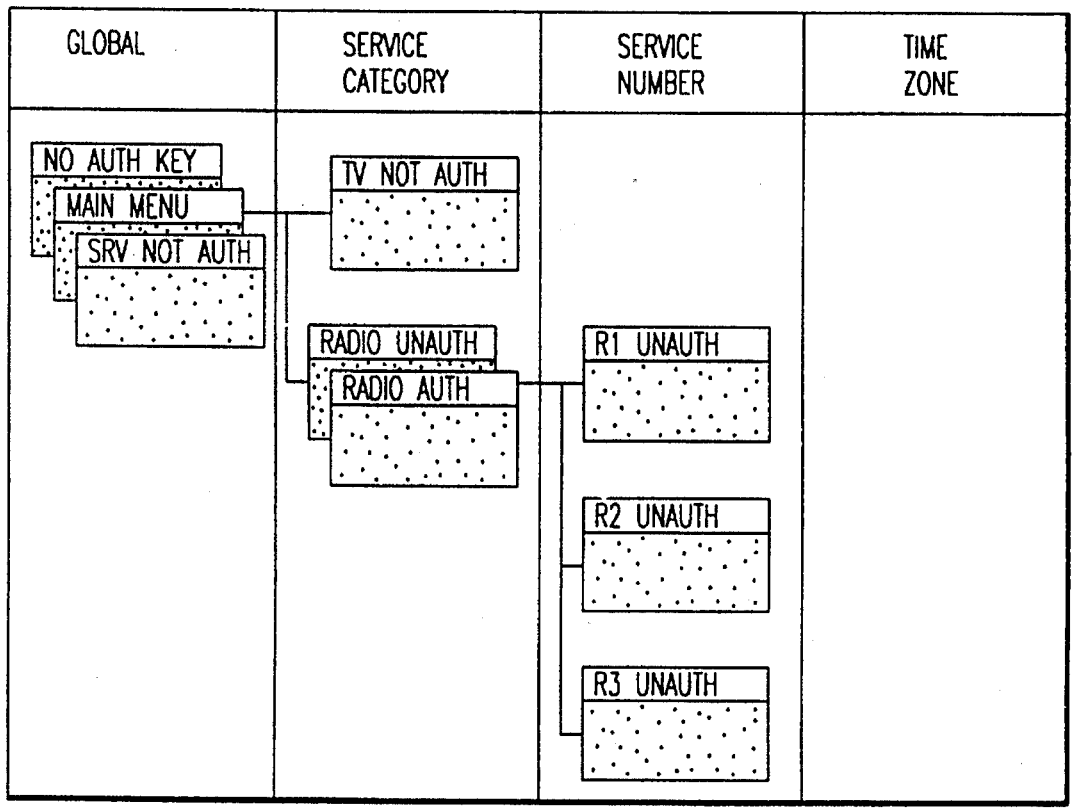

FIG. 15 illustrates the example where multiple radio services are provided. The creation of two or more radio services may be supported by using a service number filter. In the example of FIG. 15, the "Radio Authorized" page has been left as a radio category global page. Therefore, any authorized decoder tuned to a radio channel will get the same page. The "Radio Authorized" page could easily be made radio service specific by applying the service number filter to the page.

The "Radio Not Authorized" page is specific for each of the radio services, in this example, three as shown in FIGS. 16A–16C. In each page, row 7 is protected as a global row. Row 11 is a radio category specific row and is, thus, common to all radio category pages. Row 9 contains the radio service specific text. Transmission of the TTX support for the configuration depicted in FIGS. 15 and 16A–16C requires twelve (12) rows of TTX. The twelve (12) rows of teletext are depicted in FIG. 17.

Figure 18:
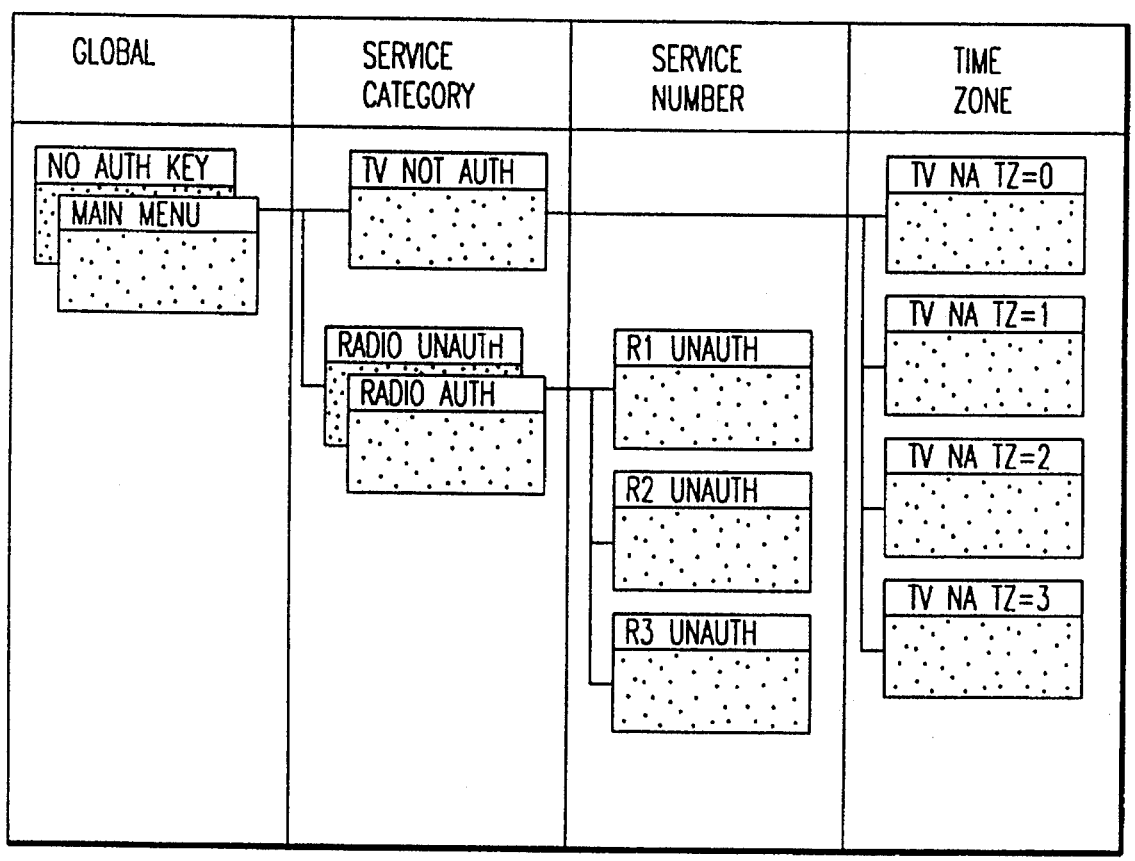
FIG. 18 depicts an example of a television with time zone and multiple radio service configuration according to the present invention.

FIG. 18 depicts the example of FIG. 15 with the addition of television service time zone information. The television "Service Not Authorized" page is received by all decoders not authorized for television. In this example, the information presented in the television "Service Not Authorized" page could contain the start time of the next television program. Accordingly, the user would be prompted to try again at later time. However, the start time of the next television program may be different depending on the time zone in which the decoder is located. The local time for a particular decoder is displayed in the ideal case. A time zone filter may be used to implement local time display across a variety of time zones.

Because there is only one television service in the present example, there is no need for a service number filter for the television service category. Accordingly, the service number filter for the television category may be disabled. It should be clear that if several different television services were implemented, a service filter for the television category may be easily implemented. In the present example, however, the time zone filter is set for each time zone that is supported as illustrated in FIG. 18.

FIGS. 19A–19D illustrate the individual TTX pages that may be created. As in the above examples, row 7 in each of FIGS. 19A–19D remains global, rows 9 and 11 are category specific, and row 12 is time zone specific. FIG. 20 illustrates the various rows of information used to transmit. In all, twenty-two (22) rows are required to transmit the "Service Not Authorized" page for all categories, services, and time zones.

FIG. 21 illustrates the example of FIG. 18 with the addition of a closed captioning to support, for example, foreign languages. Line 21 captions (i.e., captions which appear on line 21 of the displayed television signal) allow support of dual language closed captions. The availability of such closed captioning can be facilitated by enabling a language filter. In the previous examples, the global pages were said to be available to all decoders without restriction. However, if a language filter is implemented, all pages would be available to all decoders without restriction only if the language filter was also disabled for all pages. An operator may choose to provide full dual language support by creating all of the required TTX pages for the second language and setting the dual language filter appropriately. Alternatively, English may be used as a default global language and the alternate language alone can be supported with closed captioning. Thus, all pages would be in English with only the caption page selectable to the alternative language. The latter example is depicted in FIG. 21.

The system of TTX support for multiple virtual channels requires operator maintenance. Accordingly, it is therefore convenient for operators bestow limited authority on maintenance persons, hereinafter referred to as users, to perform network maintenance functions. It should be noted that "users" in this context differs from "subscribers" to whom the services are provided. In an embodiment of the present invention, a user is defined with a user name and privileges. The user name identifies the user to the system. Privileges define the user's responsibilities. Privileges may have two components: scope and rights. Scope is the segment of the network available to the user. The rights define what actions the user is permitted to take in the available network.

For example, a user may have the right to VIEW, EDIT, or CREATE. VIEW rights only permit the user to read data. EDIT rights allow the user to read and modify any data within the user's scope. The CREATE right allows the user to view and edit data, as well as set filters to any value within the user's scope.

The scope may be specified based on the filters. Each scope filter may be set to the following values: GLOBAL, ALL, or a list of specific filter values. The setting of a scope for a user defines which set of page filters are accessible, not what the page filters are themselves set to. Therefore, page filters and scope filters as used herein must be distinguished. As noted above, scope filters define the list of accessible page filters. The user's scope consists of all data that pass the scope filters. When a filter is set to GLOBAL, only data that has the filter disabled will pass. A filter set to ALL will permit all data to pass. A filter set to specific values will only allow data with the filter disabled or with the specific filter values to pass.

The following example illustrates how users can be created. It is assumed that a network has a single television service. Each system will have a TTX administrator will full privileges as illustrated by the definition shown in FIG. 22. Because the only service offered is television service, only the TTX administrator is required. The TTX administrator creates complete pages. There is no reason to restrict access because there are no other users.

FIG. 23 illustrates the example of FIG. 22 where a single radio service is added. The addition of the radio service can be accommodated by creating a user to manage the television service and a user to manage the radio service. The television manager is assigned all television related responsibilities. Accordingly, the risk that the TTX administrator accidently modified radio service data when accessing television related data is reduced.

As can be seen from FIG. 23, the TTX administrator can disallow modification of language dependent data by the television manager and the radio manager by defining their scope and rights in connection with the language filter as GLOBAL and VIEW, respectively. All data has the language filter disabled for this example, and the TTX administrator has reserved the right to create new languages and has restricted the rights of the radio and television managers thereto. Both managers are given view rights to language data to thereby allow them to retrieve pages.

The managers have been given CREATE rights to their respective categories. This allows them to modify and create category specific data for their categories.

The TTX administrator creates the global "Service Not Authorized" page shown in FIG. 24A. As can be seen, rows 1–7 and 13–19 have been designated as global rows. Only users who have at least EDIT rights with their scope set to ALL or GLOBAL on every filter may modify these rows. Rows 8–12 have been allocated for use by category managers. Because the television and radio service managers are invested with CREATE rights with respect to their categories, they may customize rows 8–12. For example, the television manager may create the page shown in FIG. 24B. The radio manager may create the page shown in FIG. 24C. Note that rows 8–12 have been allocated for television category use by the television manager and for radio category use by the radio category manager.

The addition of multiple radio services to the example of FIG. 23 can be supported using the same user configuration, in which case the radio category manager would also be responsible for each radio service. Alternatively, new users may be created as illustrated in FIG. 25. In FIG. 25, a new user for radio service 1 and a new user for radio services 2 and 3 have been created. The radio manager has decided to grant the new radio service users EDIT rights only with respect to their radio services. Thus, the new radio service managers will only be able to modify data corresponding to their radio services. They are not able to create new radio service number specific data. With the exception of the TTX administrator, the radio manager has retained sole responsibility for allocating radio service number specific data.

The radio manager creates the "Radio Service Not Authorized" page for radio service 1 as illustrated in FIG. 26A. Rows 8–12 remain radio category pages. The radio manager allocates row 9 for user by radio service 1. Only having EDIT rights with respect to radio service 1 data, the radio service 1 user cannot modify rows 8, 10, 11, and 12. Radio service 1 user may enter data on row 9 only as shown in FIG. 26B. All other rows may be viewed but not changed.

The radio manager must repeat the page creation for radio services 2 and 3. This may be accomplished by replacing the service filter value of 1 with 2 and 3, respectively. Likewise, using EDIT rights, radio service 2 and 3 user also creates the required service pages by entering the appropriate data in row 9.

FIG. 27 illustrates a system similar to that of FIG. 25 with the addition of a user definition supporting television time zone data. As illustrated in FIG. 27, the new television time zone user has EDIT rights with respect to television time zone data and VIEW rights with respect to language, category, and service number data. Accordingly, the time zone user is responsible solely for television time zone specific pages. The television time zone user thus has the ability to modify television time zone specific data, but not create new television time zone specific data. The television manager has assumed the responsibility for allocating television time zone specific data.

The television time zone user can create the page illustrated in FIG. 28 for time zone 1, for example. The television manager may create the page of FIG. 28 with row 12 empty and allocated for time zone 1. The page must be recreated for each time zone with row 12 allocated for each available time zone. The television time zone user fills in row 12 with the appropriate time zone data.

FIG. 29 illustrates an user definition scheme in which closed captioning television services are supported. In this case, the responsibility for television captioning is delegated to the television manager. The television manager has been given CREATE rights to the global language and language 1. The television manager may thus create global and language 1 specific data. Accordingly, the television manager is provided with a wide range of power to support language 1 for all television data, not only for captions.

As illustrated in FIGS. 30A and 30B, the television manager may create two empty pages, both assigned to the television category, but one for global language and for language 1 data. For example, FIG. 30A may represent an English language caption page and FIG. 30B may represent a French language caption page.

With some networks, such as impulse pay-per-view (IPPV) networks, for example, it is desirable or even necessary to provide TTX system support to guide a subscriber through procedures, such as to purchase an event for IPPV. These networks may require, for example, program specific information to be entered on a TTX page. In the case of IPPV, for example, a subscriber would likely be reluctant to purchase a program unless he knew the title and cost of the program. Such information may change relatively frequently and would require a considerable investment in manpower if the pages had to be manually updated and placed on transmission.

It is possible to take advantage of circumstances in which broader classes of information remain relatively constant even though specific information changes frequently. Again, using IPPV as an example, every IPPV program has a title and a cost, however the exact values of change program to program. Accordingly, a generic TTX page could be created with place holders where the changing data can be placed. Such pages will be referred to herein as skeleton pages, and the place holders will be referred to as templates. On a program change, new templates may be loaded and automatically modify all skeleton pages. Of course, as the above description suggests, skeleton pages are not restricted to IPPV networks.

While the following example will be described in the context of IPPV, it should be understood that any network that has relatively frequently changing data over relatively static TTX pages may take advantage of skeleton pages to automatically update pages. A skeleton page illustrated in FIG. 31A. The "S%" attribute in the title row identifies the page as a skeleton page with a template delimiter "%". Of course, skeleton pages and template delimiters can be identified in other ways. All templates are named and placed in the skeleton page surrounded by "%". The placement of the "%"'s determines the size of the template. For example, the above page has the following templates: movie rating, PR; movie title, TITLE; Stars of the movie, STARS; and the cost of the movie, COST. When the program is aired, the templates must be filled. FIG. 31B depicts the skeleton page of FIG. 31A having: PR= "G"; TITLE= It's A Wonderful Life"; STARS= "James Stewart"; and COST = "$2.50".

Logical filters allow for the dynamic allocation and ordering of the physical filters discussed above. In the discussion of FIGS. 11–31B, it was assumed that the initial allocation of bits to each physical filter and their definitions will be sufficient to support all TTX features, present and future. In addition, the above description included implied a hierarchy for the filters. For example, filters were activated first by language, then by category, service number, time zone, etc. While some filter types may have an implied priority, other may not. For example, all things being equal, the language filter may have the highest priority or the lowest priority. However, in the context of specific systems, there may be a valid reason to allocate a language filter as the highest priority, or as the lowest priority. For example, the system operator may wish to create users responsible for maintaining a specific language. In such a case, the language filter may be set to have the highest priority. Alternatively, if pay-per-view (PPV) were important, an operator may set category to the highest priority and create users to manage the PPV movie category.

A logical filter is a grouping of physical filters. Each physical filter may be a member of only one logical filter. The logical filter is created by combining all of the physical filter values. The physical filter number determines how the physical filter values are concatenated. For example, the higher the physical filter number the higher the bit position. Accordingly, a logical filter comprised of physical filters 1 (PF1), 5 (PF5), and 7 (PF7) will have a physical filter value constructed by concatenating PF7, PF 5 and PF1, with the PF1 bits occupying the least significant bits and the PF7 bits occupying the most significant bits. The physical filter value may be padded with, for example, 0s. Of course, the specific ordering for concatenation and the padding bits should not be considered limiting.

An existing logical filter can be extended by adding another physical filter to the group, or a new filter of any size may be created from unused physical filters by grouping them together. Furthermore, logical filters can be assigned hierarchies. A hierarchy may be created, for example, by assigning logical filter numbers to each logical filter with the lower the logical filter number, the higher the ordering. However, this should not be considered to limit the present invention.

Encryption and allocation will now be discussed. Encryption is performed at the encoder and decryption is performed at the decoder. Additional details concerning encryption may be found in U.S. patent application Ser. No. 08/101,974, entitled "Method and Apparatus for Uniquely Encrypting A plurality of Services at a Transmission Site", filed Aug. 4, 1993 and incorporated herein by reference. The term "allocation" refers to the assignment of page ranges within a maximum page range for particular classifications of service. Allocation may become necessary for more limited embodiments of the encoder and/or decoder. In one preferred embodiment of the present invention, the multiplexer may perform the encoding or encrypting functions and thus may be considered an encoder or encryptor. The term "encryptor" may also be used herein to refer to an item or seed used to encrypt particular text data.

Prior to discussing the specifics of allocation, encryption will be discussed briefly. In the encrypt block 415, the encoder may maintain a teletext seed table (TST) of n teletext seeds TS0, . . ., TSn, wherein n can be any whole number. For example, n may be 31 thereby yielding 32 teletext seeds. Each teletext seed TS0, . . ., TSn in the teletext seed table represents a unique way of encryption and may be considered a physical teletext elementary stream (TES). Accordingly, the teletext seed table maps each teletext seed TS0, . . ., TSn to a corresponding TTX elementary stream TES 0, . . ., TES n. Alternatively, a table of TS's need not be stored in a table if the encryptor automatically generates TS's based on a TES. Accordingly, TES in the teletext header would indicate to the encryptor how to generate the TS's for encryption.

Each teletext seed in the teletext seed table may be generated each cryptocycle by performing a seed expansion using a 32 bit random number and a seed procreation number. The details of the seed expansion will not be discussed in herein. However, the manner in which the teletext seeds are generated is not material so long as each TS is unique. In addition, it is required that some mechanism be provided to for delivering all TS's to the decoders. Seed generation provides one method for generating unique TS's and for delivering them to the decoders.

As discussed above, the TTX system of the present invention may be configured to provide such teletext services as network control, teletext programs, teletext for non-teletext programs, broadcast or general messages, personal messages, and an electronic program guide among other possibilities. The particular filter settings, encoder requirements, decoder requirements, and page range for each of these teletext features according to two specific embodiments will be described below with reference to FIGS. 32A and 32B, respectively. It should be recognized that the specific embodiments discussed below are intended to be mere examples and that other embodiments are possible.

Three filters specify a teletext page with a particular service: service category, service number, and control. The control filter may correspond to FILTER 6, FILTER 7 or FILTER 8 of the TTX header row packet. As discussed above, the service category filter can specify between one of a number of service categories such as TV, radio, text, data, etc. The service number identifies a particular service offered from a service category. Thus, service category and service number together uniquely identify a particular service. The control filter is used to identify TTX pages which are part of a TTX service per se and pages which are used to support other services.

For network control pages, the filter setting for the control filter is, e.g. "1". The category and service number filters may have any setting, i.e. "don't care" as illustrated in FIGS. 32A and 32B. The network control pages may occupy one of two page ranges depending on implementation for reasons discussed further below. The two page ranges are illustrated in FIGS. 32A and 32B. Of course, it should be clear that the maximum range of 0000-FFFF is not intended to limit the present invention for any of the TTX features. One of the teletext seeds in the teletext seed table of the encoder is allocated for network control pages. Any encrypted pages which have the control filter set must be encrypted with this teletext seed. In the simplest case, the encoder has a fixed allocation for network control pages. In other words, one particular seed of the teletext seed table will always be allocated for the network control pages. A more complicated implementation may require dynamic allocation of TES #'s for encryption on-demand. In either case, the DISE of the decoder generates the network control seed every cryptocycle.

Broadcast or general messages (also referred to as broadcast pages) have the same security concerns and can be handled in the same manner as the network control pages. The nature of the broadcast requires that all broadcast pages have all filters except the control filter disabled so that all decoders will receive the page. The control filter will be enabled and set to, e.g., "1" to indicate a network control page.

For teletext programs, the category filter may be set to any one of the available teletext categories, e.g., TTX1, TTX2, . . ., TTXm, where m is the number of different teletext categories. TTXi of FIGS. 32A and 32B is a category as a TTX type category. The service number filter may be set to n, which may be any available service number for a particular category. The control filter is enabled and set to, e.g. "0" to indicate the absence of a network control page. The page range for teletext programs is illustrated in FIGS. 32A and 32B. The encoder must allocate (either fixed or dynamic) one teletext seed table entry for every TTX service in order to ensure that each TTX service is encrypted differently. A mapping of this allocation, i.e., TES # to filter values used to identify a particular service (just for each service category and service number) is maintained in the encoder. The encoder transmits information concerning how to generate the seed to the DISE 157 by placing the TES # into the PACKETS data, for example, in the virtual channel packet.

Once encryption is enabled, all TTX service pages will have their service category and service number filters enabled. Disabling a filter may cause rows to be shared between pages. Encryption of these rows may cause conflicts with specific annotation rows which are encrypted with a different seed. For example, a single page may include annotation rows that are specific to different services and that are encrypted differently as well as one or more common rows. If the service category and service number filters were disabled, the decoder would erroneously use both annotation rows to construct the page. Because the decryptor is loaded with the teletext seed for the page to be grabbed, the common rows may be transmitted without encryption to prevent any problems decrypting the page at different decoders. Alternatively, multiple decryptors may be provided for decrypting multiple rows encrypted differently.

Teletext support for non-teletext services may be implemented exactly as a TTX service. The category filter may be set to any non-TTX category, e.g., television, radio, etc. The service number filter may be set to n, which is any available service number for the selected category. As above, the control filter is set to, e.g. "0" to indicate the absence of a network control page. Each of the filter values and the page range is illustrated in FIGS. 32A and 32B.

Since encryption for non-TTX services is supported in the same way as TTX services, the encoder has the same requirements as for TTX services. The only difference between the two may be the method of allocating teletext seed table entries to the services. For example, TTX services may have a fixed allocation, thereby ensuring that a TES will always be available, and non-TTX services may be allocated dynamically on a first come first served basis. Thus, once all of the TES's are allocated, a non-TTX service cannot be encrypted. Of course, non-TTX services may have a fixed allocation and non-TTX services may be allocated dynamically. Both TTX and non-TTX services having TTX support appear identical to the decoder. Therefore, the decoder must handle the TTX support of non-TTX services in the same manner as TTX services.

Personal messages (PMs) may be considered a text service. PMs are typically initiated at the encoder for transmission to a subset of decoders. PMs may be encrypted addressed data packets (ADPs) which deliver the TES #, page number and a time stamp indicating when the release of the PM teletext seed is to terminate. The ADP is a particular kind of PACKETS data packet that may be received only by individual decoders. Group PMs may be implemented by individually addressing each decoder in the group.

Depending on security concerns, all PMs may be encrypted the same way. Thus, the PMs would be secure from all those who do not receive them. However, it is conceivable that a PM may be received by a subscriber (who was sent a different PM) other than to whom the it was addressed. Alternatively, PMs may be classified in groups having different encryptors. Each of the groups may be considered a different service because each has its own encryptor.

Handled as a TTX service, the PMs may have a category filter setting of TTX and a service number filter setting of n, where n is any PM TTX service number. The control filter may be set, e.g., to "0", to indicate the absence of network control data. The filter values and page range for PMs is illustrated in FIGS. 32A and 32B. The transmission of PM pages and ADPs must be tightly coupled in time because the ADP triggers the page grab. If either the PM or the ADP is absent, the page is not received. The PM ADP has a limited life span and the encoder must ensure that the PM page is transmitted with sufficient frequency within this life span. The DISE must release the PM teletext seed for a limited number of cryptocycles after it receives the PM ADP.

The electronic program guide (EPG) may be offered as a standard feature or as a revenue generating TTX service. If offered as a standard feature, the EPG pages may be treated as network control pages. For example, the standard electronic program guide could be accessed as a selection from a main menu. Accordingly, the electronic program guide would occupy a portion of the network control page range as illustrated in FIG. 32A since these pages would be indistinguishable from other network control pages.

Alternatively, the EPG may be offered as a TTX service, where the EPG pages may be treated as a unique TTX service. TTX service electronic program guide requires that the decoder tune to the TTX service. A virtual channel will be available to support the electronic program guide and a full range of EPG pages is possible as illustrated in FIG. 32B. The filter settings for TTX service electronic program guide are identical to TTX service filter settings, namely the category filter is set to TTX, the service number filter is set to n, and the control filter is set, e.g. "0" to indicate the absence of network control pages.

The encoder maintains TTX encryption by mapping services to teletext seed table entries. In one implementation, there is one fixed allocation for the network control pages and the rest are dynamically allocated for use by the electronic program guide, personal messages, and service pages, both TTX and TTX support for non-TTX services. In a more flexible implementation, all pages may be dynamically allocated.

The allocation example depicted in FIG. 33 allows for easy calculation of teletext seed table entries. The network control pages will have a reserved TES # of 31. The personal messages will have a reserved TES # of 30. This limits the personal messages to one physical text stream, i.e. only one class of encryption for all personal messages. However, the TES # may still be transmitted in the ADP to allow for future reallocation. In the simplest case only one type of TTX category exists. By reserving TTX service TES #s starting at 0, the TES # can be made to correspond with the TTX service number. Only non-TTX service numbers would not have a simple correlation with TES #s. The encoder will dynamically allocate TES #s to non-TTX services.

The allocation scheme described above is particularly useful when the multiple page grabbing logic is similar to that depicted in FIG. 7, where each page grabber has its own decryptor and aggregate filter comparator. However, multiple page grabbing logic similar to that depicted in FIG. 8 limits the available allocation of page ranges for particular services. As in FIG. 8, each page grabber shares a decryptor (the seed limitation) and aggregate filter comparator (the filter limitation). As a result, each page grabber will use the same filter values and decryption seeds with only the page number unique to each grab.

One consequence of the filter limitation is that the decoder is forced to perform only one TTX function at any time, i.e., grabbing network control pages, or viewing a TTX service, or receiving a personal message, etc. However, it is desirable to receive personal messages in the background even if the decoder is viewing other TTX pages. Therefore, in order to implement a system that meets subscriber and operator expectations, the TTX functions that may occur simultaneously must be identified. Further, each of these TTX functions must generate matches for the same aggregate filter comparator. Since only the page number may be used to identify these TTX functions uniquely, the simultaneous TTX functions must exist together in the page address space. If, for example, broadcast pages, network control pages, service related pages, and personal messages each must be capable of being received simultaneously, the decoder must simultaneously grab broadcast pages, network control or service related pages, and personal message pages. If broadcast pages are lumped together with network control pages, the simultaneous grabs could be expanded to network control pages including broadcast pages, service related pages (i.e., TTX service pages and TTX support for Non-TTX services), and personal message pages.

In the example of FIGS. 32A and 32B, network control pages were identified by the control filter. Under the filter limitation, setting the filters to grab a network control page prevents service related and personal message pages from being grabbed since they have their unique control bits cleared. Thus, the control filter may no longer be used since it is unique for network control pages. Network control pages must be distinguished from service related and personal messages using the page number filter. The result is that the network control pages may no longer occupy the full page range of 0000-FFFF. Rather, this page range must be divided among the various TTX features.

Service related and personal message pages use the category and service number filters to identify themselves. The service related and network control pages grabbed will depend on the particular service that the decoder is tuned to. The decoder retrieves filter information from the virtual channel selected by the subscriber for viewing. However, setting the filters according to the virtual channel prevents personal messages from being received since they have their own unique category (TTX) and service number which may be different from the channel selected by the subscriber. As with the network control pages, a portion of the full page range must be allocated for personal messages. The personal messages may no longer enable the category and service number filters. Both must be disabled to allow any decoder to receive them no matter which virtual channel is being viewed. The new page ranges for the features are illustrate in FIG. 34.

Despite the limitation in page range, other defined filters may still be enabled. Thus, several pages having the same page number may be distinguished using these filters. The operator may ensure that the subscriber receives certain messages by disabling these filters.

The encryption of the pages described above does not change. The determination of which page belongs to which service also does not change. In some implementations, the encoder can determine the usage of a page based on its service category and service number filters. In other implementations, the page number must also be used to identify the TES for encryption.

The seed limitation prevents the decoder from grabbing multiple pages that are encrypted with a different teletext seed. All services cannot be encrypted with the same teletext seed for security reasons. The TTX decryptor may be modified to allow for multiple teletext seeds. Ideally there should be exactly as many teletext seeds as there are simultaneous TTX functions, for example, three in the case discussed above. It may be acceptable to specify that a broadcast page may not be encrypted, since the broadcast is received by all encoders. If this is the case, then only two seeds need to be supported.

While the present invention has been disclosed with respect to a preferred embodiment and modifications thereto, it is to be understood that the invention is not limited to the precise embodiments and that various changes and modifications may be effected therein by those in the art without departing from the scope and spirit of the invention.

We claim:

1. In a receiver of a communication system for receiving digital data streams of a plurality of services multiplexed in a sequence of frames, wherein a frame of said sequence of frames includes a teletext header packet defining at least a portion of a teletext page and having a plurality of filter fields, each filter field having a filter value, an apparatus for generating a teletext page comprising:

extracting means for extracting the teletext header packet from the frame, wherein said teletext header packet includes a page number filter field having a page number value and a plurality of aggregate filter fields each having a filter value;

comparing means for comparing the filter value for each filter field of the extracted teletext header packet to a corresponding requested filter value and for generating a matching signal if each filter value matches the corresponding requested filter value, wherein said comparing means comprises:

a page comparator for comparing the page number value to a requested page number value; and an aggregate filter comparator for comparing the filter values of the aggregate filter fields to corresponding requested filter values, wherein the aggregate filter field comprises a language filter field having a language value, and wherein said aggregate filter comparator comprises a filter comparator for comparing the language value to a requested language value; and constructing means, responsive to the matching signal, for constructing the portion of the teletext page defined by the extracted teletext header packet.

2. The apparatus of claim 1, wherein the aggregate filter field further comprises a category filter field having a category value, and wherein said aggregate filter comparator comprises a filter comparator for comparing the category value to a requested category value.

3. In a receiver of a communication system for receiving digital data streams of a plurality of services multiplexed in a sequence of frames, wherein a frame of said sequence of frames includes a teletext header packet defining at least a portion of a teletext page and having a plurality of filter fields, each filter field having a filter value an apparatus for generating a teletext page comprising:

extracting means for extracting the teletext header packet from the frame wherein said teletext header packet includes a page number filter field having a page number value and a plurality of aggregate filter fields each having a filter value;

comparing means for comparing the falter value for each filter field of the extracted teletext header packet to a corresponding requested filter value and for generating a matching signal if each filter value matches the corresponding requested filter value, wherein said comparing means comprises;

a page comparator for comparing the page number value to a requested page number value; and an aggregate filter comparator for comparing the filter values of the aggregate filter fields to corresponding requested filter values, wherein the aggregate filter field comprises a service number filter field having a service number value, and wherein said aggregate filter comparator comprises a filter comparator for comparing the service number value to a requested service number value; and constructing means responsive to the matching signal, for constructing the portion of the teletext page defined by the extracted teletext header packet.

4. The apparatus of claim 1, wherein the aggregate filter field further comprises a time zone filter field having a time zone value, and wherein said aggregate filter comparator comprises a filter comparator for comparing the time zone value to a requested time zone value.

5. In a receiver of a communication system for receiving digital data streams of a plurality of services multiplexed in a sequence of frames, wherein a frame of said sequence of frames includes a teletext header packet defining at least a portion of a teletext page and having a plurality of filter fields, each filter field having a filter value, an apparatus for generating a teletext page comprising:

extracting means for extracting the teletext header packet from the frame, wherein said teletext header packet includes a page number filter field having a page number value and a plurality of aggregate filter fields each having a filter value;

comparing means for comparing the filter value for each filter field of the extracted teletext header packet to a corresponding requested filter value and for generating a matching signal if each filter value matches the corresponding requested filter value, wherein said comparing means comprises:

a page comparator for comparing the page number value to a requested page number value; and an aggregate filter comparator for comparing the filter values of the aggregate filter fields to corresponding requested filter values, wherein the aggregate filter field comprises a security element filter field having a security element value, and wherein said aggregate filter comparator comprises a filter comparator for comparing the security element value to a requested security element value; and constructing means, responsive to the matching signal, for constructing the portion of the teletext page defined by the extracted teletext header packet.

6. In a receiver of a communication system for receiving digital data streams of a plurality of services multiplexed in a sequence of frames, wherein a frame of said sequence of frames includes a teletext header packet defining at least a portion of a teletext page and having a plurality of filter fields, each filter field having a filter value, an apparatus for generating a teletext page comprising:

extracting means for extracting the teletext header packet from the frame, wherein said teletext header packet includes a page number filter field having a page number value and a plurality of aggregate filter fields each having a filter value;

comparing means for comparing the filter value for each filter field of the extracted teletext header packet to a corresponding requested filter value and for generating a matching signal if each filter value matches the corresponding requested filter value, wherein said comparing means comprises:

a page comparator for comparing the page number value to the requested page number value; and an aggregate filter comparator for comparing the filter values of the aggregate filter fields to corresponding requested filter values; and constructing means, responsive to the matching signal, for constructing the portion of the teletext page defined by the extracted teletext header packet, wherein the teletext header packet further includes a filter enable value corresponding to each of the aggregate filter fields, each filter enable value having either a first or a second value, wherein said aggregate filter determines for each aggregate filter field a match if (1) its filter value matches the corresponding request filter value and the corresponding filter enable value has a first value or (2) the corresponding filter enable value has a second value, wherein said each filter value is independently compared to each of the corresponding requested filter value and each corresponding filter value must match the corresponding request filter value if the matching signal is to be generated.

7. In a receiver of a communication system for receiving digital data streams of a plurality of services multiplexed in a sequence of frames, wherein a frame of said sequence of frames includes a teletext header packet defining at least a portion of a teletext page and at least one teletext data packet associated with the teletext header packet, the teletext header packet having a page number filter field having a page number value and aggregate filter fields having aggregate filter values, an apparatus for generating a teletext page comprising:

extracting means for extracting the teletext header packet from the frame;

page comparators, each comparing the page number filter value of the extracted teletext header packet to a respective requested page number value and for outputting a matching signal if the page number filter value matches the respective requested page number value;

at least one aggregate filter comparator for comparing the aggregate filter values of the extracted teletext header packet to requested aggregate filter values and for outputting a matching signal if the aggregate filter values match the requested aggregate filter values;

page grab logic circuits, each responsive to the matching signal from one of said page comparators and the matching signal from the at least one aggregate filter, for outputting page construction information according to the at least one teletext data packet and to the teletext header packet; and page construction memory associated with each page grab logic circuit for receiving the page construction information thereby forming the portion of the teletext page defined by the teletext header packet.

8. The apparatus of claim 7, wherein the at least one teletext data packet is encrypted, and further comprising:

at least one decryptor for decrypting the encrypted teletext data packet and for supplying the decrypted teletext data packet to said page grab logic circuits.

9. The apparatus of claim 7, further comprising:

a plurality of aggregate filter comparators, each comparing the aggregate filter values of the extracted teletext header packet to respective requested aggregate filter values and for outputting a matching signal to one of said page grab logic circuits if the aggregate filter value match the respective requested aggregate filter values.

10. The apparatus of claim 9, wherein the at least one teletext data packet is encrypted, and further comprising:

a plurality of decryptors, each decryptor decrypting the encrypted teletext data packet and for supplying the decrypted teletext data packet to one of said page grab logic circuits.

11. A method of constructing at least a portion of a teletext page defined by a teletext header packet in a data frame, the data frame comprising a multiplex of digital data streams corresponding to a plurality of services, the teletext packet includes a plurality of filter fields, each filter field having a filter value, said method comprising the steps of:

extracting the teletext header packet from the frame wherein said teletext header packet includes a page number filter field having a page number value and a plurality of aggregate filter fields each having a filter value, a step of comparing comprises:

comparing the page number value to a requested page number value; and comparing the filter values of the aggregate filter fields corresponding requested filter values;

generating a matching signal if each filter value matches the corresponding requested filter value; and constructing the portion of the teletext page defined by the extracted teletext header wherein the teletext header packet further includes a filter enable value corresponding to each of the aggregate filter fields, each filter enable value having either a first or a second value, wherein said aggregate filter determines for each aggregate filter field a match if (1) its filter value matches the corresponding requested filter value and the corresponding filter enable value has a first value or (2) the corresponding filter enable value has a second value wherein said each filter value is independently compared to each of the corresponding requested filter value and each corresponding filter value must match the corresponding request filter value if the matching signal is to be generated.

12. The apparatus of claim 3, wherein the aggregate filter field further comprises a category filter field having a category value, and wherein said aggregate filter comparator comprises a filter comparator for comparing the category value to a requested category value.

13. The apparatus of claim 5, wherein the aggregate filter field further comprises a category filter field having a category value, and wherein said aggregate filter comparator comprises a filter comparator for comparing the category value to a requested category value.

14. The apparatus of claim 3, wherein the aggregate filter field further comprises a time zone filter field having a time zone value, and wherein the aggregate filter comparator comprises a filter comparator for comparing the time zone value to a requested time zone value.

15. The apparatus of claim 5, wherein the aggregate filter field further comprises a time zone filter field having a time zone value, and wherein the aggregate filter comparator comprises a filter comparator for comparing the time zone value to a requested time zone value.

* * * * *

UNITED STATES PATENT AND TRADEMARK OFFICE
CERTIFICATE OF CORRECTION

PATENT NO. : 5,519,780
DATED : May 21, 1996
INVENTOR(S) : Arthur S. Woo; Wayne S. Sheldrick; Keith B. Gammie; Hrad Hekimian It is certified that error appears in the above-indentified patent and that said Letters Patent is hereby corrected as shown below:

Column 1, line 18, "08/160,835" should be --08/160,830--.
Column 6, line 19, "80/160,39" should be --08/160,839--.
Column 6, line 45, "08/161,154" should be --08/161,159--.

Signed and Sealed this

Twenty-second Day of April, 1997

BRUCE LEHMAN

*Commissioner of Patents and Trademarks*

Attest:

*Attesting Officer*